United States Patent
Baptista et al.

(10) Patent No.: US 10,589,435 B2
(45) Date of Patent: Mar. 17, 2020

(54) SHOULDER MODULE FOR AN EXOSKELETON STRUCTURE

(71) Applicants: SAFRAN ELECTRONICS & DEFENSE, Boulonge-Billancourt (FR); B-TEMIA INC., Québec (CA)

(72) Inventors: Jonathan Baptista, Boulogne-Billancourt (FR); Roland Thieffry, Boulogne-Billancourt (FR); Jordane Grenier, Boulogne-Billancourt (FR); Alexandre Vaure, Boulogne-Billancourt (FR)

(73) Assignees: SAFRAN ELECTRONICS & DEFENSE, Boulogne-Billancourt (FR); B-TEMIA INC., Québec, QC (CA)

( * ) Notice: Subject to any disclaimer, the term of this patent is extended or adjusted under 35 U.S.C. 154(b) by 4 days.

(21) Appl. No.: 16/065,564

(22) PCT Filed: Dec. 23, 2016

(86) PCT No.: PCT/EP2016/082598
§ 371 (c)(1),
(2) Date: Jun. 22, 2018

(87) PCT Pub. No.: WO2017/109197
PCT Pub. Date: Jun. 29, 2017

(65) Prior Publication Data
US 2019/0344456 A1    Nov. 14, 2019

(30) Foreign Application Priority Data
Dec. 24, 2015   (FR) ...................................... 15 63349

(51) Int. Cl.
*B25J 9/00*   (2006.01)
*B25J 19/02*   (2006.01)
(Continued)

(52) U.S. Cl.
CPC ............ *B25J 19/02* (2013.01); *A61H 1/0281* (2013.01); *A61H 3/00* (2013.01); *B25J 9/0006* (2013.01); *A61H 3/008* (2013.01)

(58) Field of Classification Search
CPC ............................... B25J 9/006; A61H 1/0281
See application file for complete search history.

(56) References Cited

U.S. PATENT DOCUMENTS

| 3,277,594 A | 10/1966 | Rogers et al. |
| 6,301,526 B1 | 10/2001 | Kim et al. |
| 7,066,896 B1 | 6/2006 | Kiselik |

FOREIGN PATENT DOCUMENTS

| KR | 10-2014-0089827 A | 7/2014 |
| WO | 2012/042471 A1 | 4/2012 |
| WO | 2015/099858 A2 | 7/2015 |

OTHER PUBLICATIONS

French Preliminary Search Report for 1563349, dated Sep. 23, 2016.

(Continued)

*Primary Examiner* — Marcia L Watkins
(74) *Attorney, Agent, or Firm* — Sughrue Mion, PLLC

(57) ABSTRACT

A shoulder module (3) for an exoskeleton structure that connects to an elbow module (4) attached to an arm of a user to a back module (2) attached to the back of the user. The shoulder module (3) has a plurality of connecting parts (34, 36, 38, 310), and a first pivot (35) connecting two of the connecting parts (34, 36) while allowing rotation of one of the connecting parts with respect to the other connecting part (34) according to a first axis of rotation ($X_1$), during a rotation of the elbow module (4) with respect to the back module (2) corresponding to an abduction or adduction movement of the shoulder of the user. The connecting parts (34, 36, 38, 310) include a connecting part (38) comprising two parts (381, 382) that slide to allow shortening or (Continued)

Figure 1:
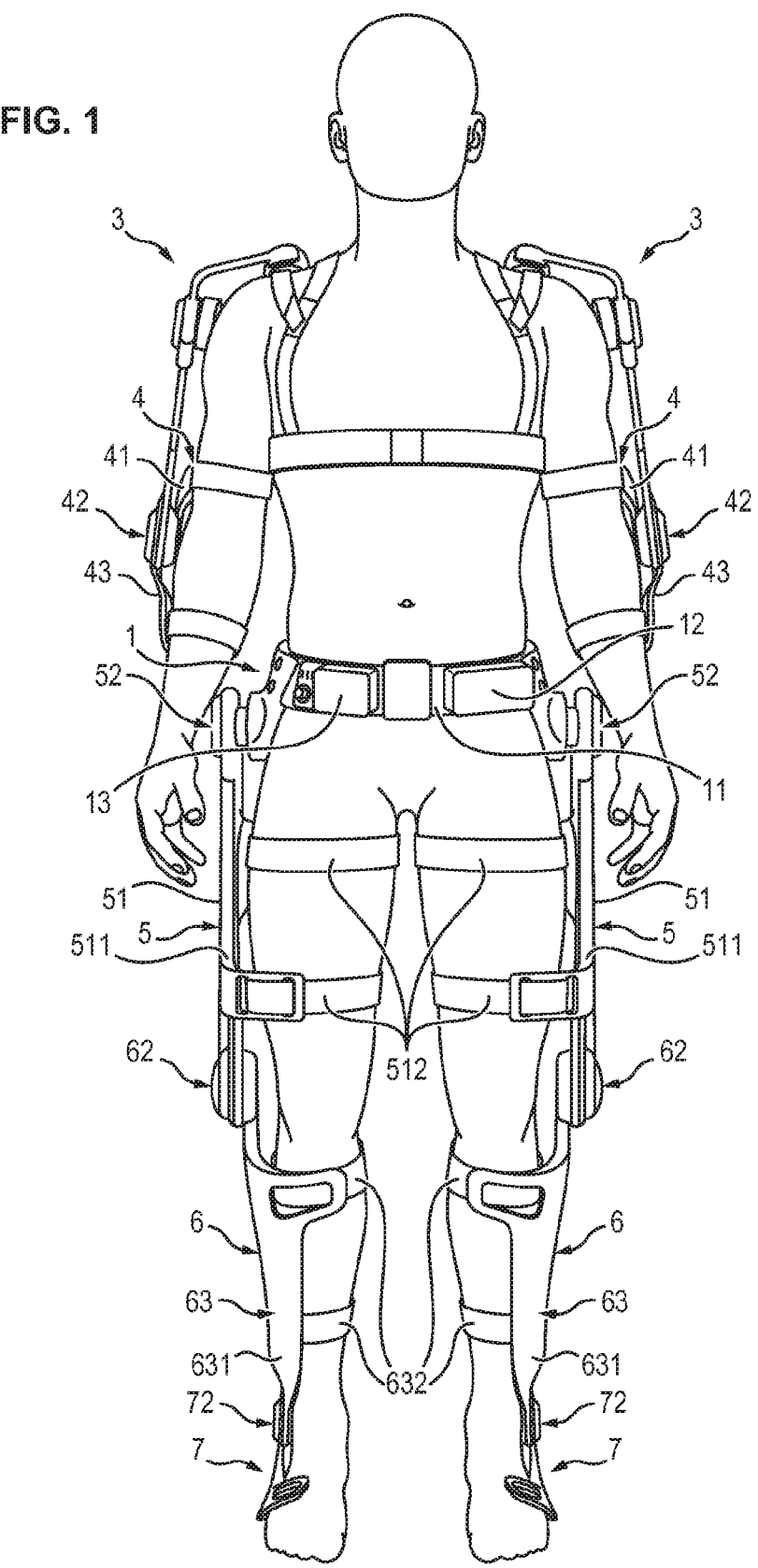

lengthening of the connecting part (38) of the elbow module (4).

15 Claims, 18 Drawing Sheets

(51) Int. Cl.
*A61H 3/00* (2006.01)
*A61H 1/02* (2006.01)

(56) References Cited

OTHER PUBLICATIONS

International Search Report for PCT/EP2016/082598, dated Mar. 23, 2017.
Written Opinion of the International Searching Authority (WO/ISA), dated Jun. 26, 2018, in International Application No. PCT/EP2016/082598.

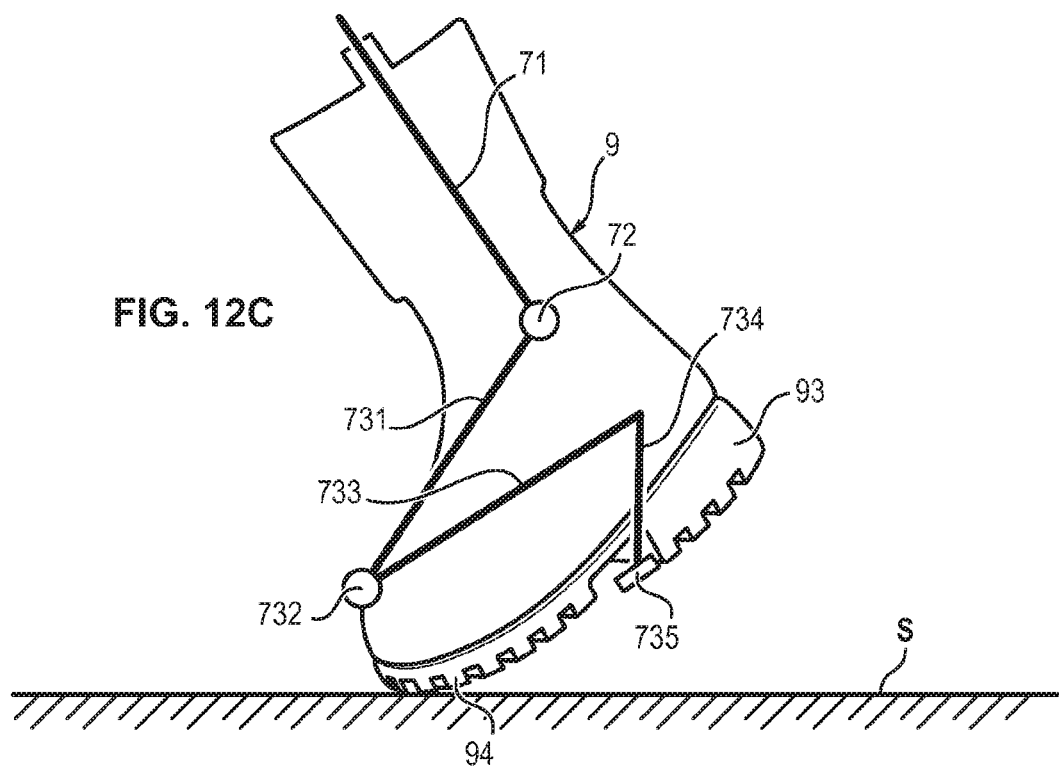

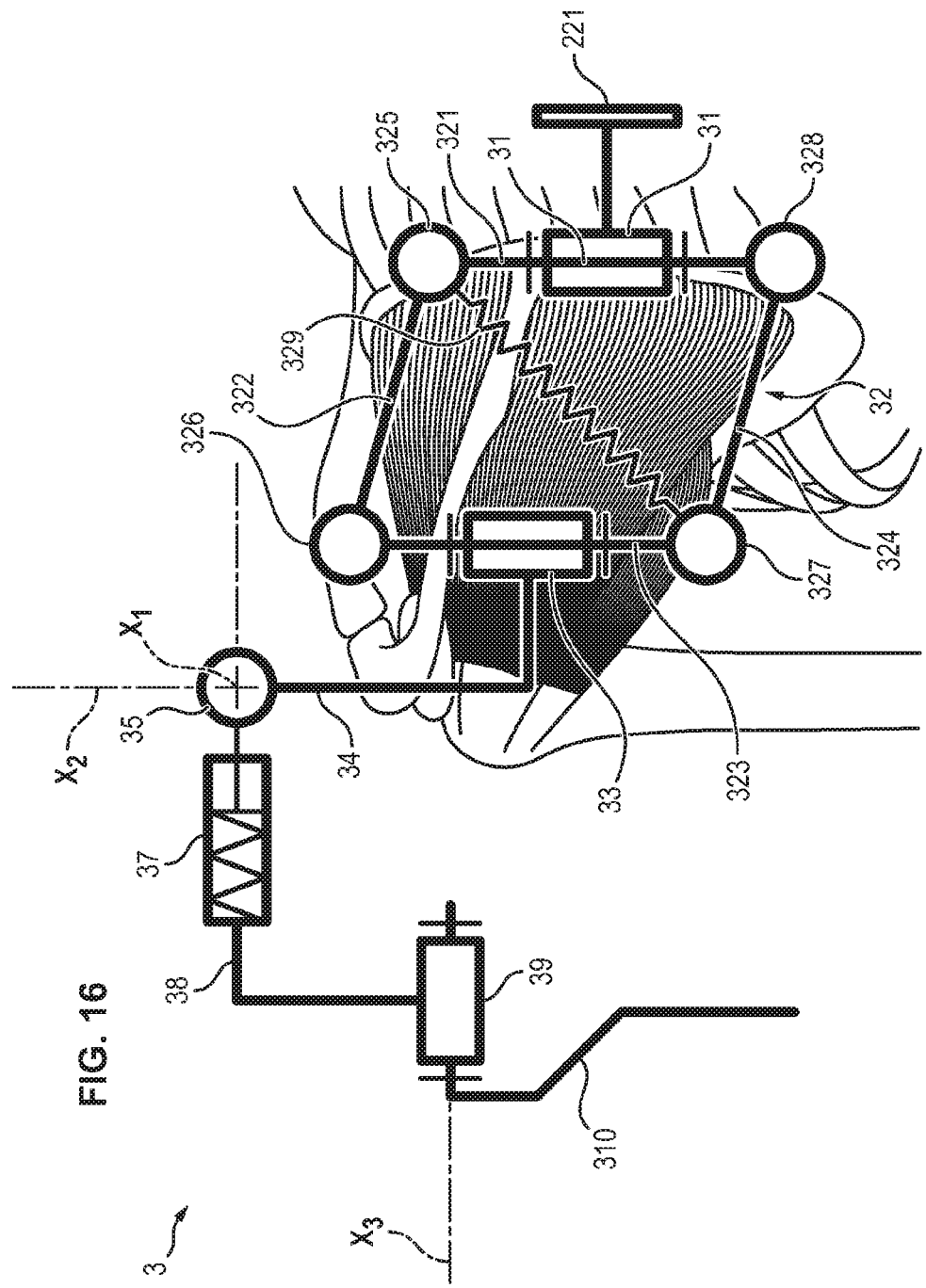

SHOULDER MODULE FOR AN EXOSKELETON STRUCTURE

This application is a National Stage of International Application No. PCT/EP2016/082598 filed Dec. 23, 2016, claiming priority based on French Patent Application No. 1563349 filed Dec. 24, 2015.

FIELD OF THE INVENTION

The invention relates to a shoulder module for an exoskeleton structure that provides force assistance to a user.

PRIOR ART

Exoskeletons that provide force assistance are mechanical structures which duplicate the structure of the human skeleton and which allow an improvement in the physical capacities of the human body.

There exist different exoskeletons that provide force assistance, of which the shape and the structure depend on the tasks to be accomplished by the user.

Generally, each exoskeleton is designed to assist the user for accomplishing one very specific task.

In particular, there exist exoskeleton structures designed to be attached to the upper body of a user to assist the user in his arm movements, particularly for lifting and handling loads.

However, these structures generally do not allow adaptation to all the movements of the joint complex of the shoulder. For example, these structures can allow a flexure and extension movement of the shoulder, but not allow an abduction and adduction movement of the shoulder.

However, the joint complex of the shoulder is a complex double joint having six degrees of freedom, including three degrees of freedom provided by the shoulder itself, and three degrees of freedom provided by the scapular belt supporting the shoulder.

Other structures have also been proposed which allow better reproduction of the movements of the shoulder. However, these structures generally have considerable bulk or do not coincide with the mobilization logic of the shoulder, which impedes the mobility of the user.

SUMMARY OF THE INVENTION

One aim of the invention is to propose a shoulder module for an exoskeleton structure which provides greater freedom of movement of the joint complex of the shoulder of the user, while being compact and light compared to existing technologies.

This aim is achieved within the scope of the present invention thanks to a shoulder module for an exoskeleton structure, the shoulder module being designed to connect an elbow module attached to an arm of a user to a back module attached to the back of the user, the shoulder module comprising:

a plurality of connecting parts, and
a first pivot connecting two of the connecting parts while allowing rotation of one of the connecting parts with respect to the other connecting part according to a first axis of rotation, during a rotation of the elbow module with respect to the back module corresponding to an abduction or adduction movement of the shoulder of the user, in which the connecting parts include a first connecting part comprising two parts mounted sliding with respect to one another by means of a first slideway, the sliding of the parts with respect to one another allowing shortening of the connecting part during rotation of the elbow module with respect to the back module caused by an abduction movement of the shoulder of the user and allowing lengthening of the first connecting part during rotation of the elbow module with respect to the back module caused by an adduction movement of the shoulder of the user, and in which the first slideway comprises an elastic return element tending to oppose a separation of the parts with respect to one another leading to a lengthening of the first connecting part.

In such a module, the first axis of rotation does not necessarily coincide with the real axis of rotation of the shoulder. In fact, the lengthening and shortening of the connecting part allow variation in the length of the connecting part so as to compensate the offset of the rotation axes.

Moreover, the elastic return element allows the user to be assisted in his abduction movement of the shoulder by compensating for the weight of the elbow module.

In this manner, it is possible to design a shoulder module in which the connecting parts are positioned close to the body of the user, which allows the design of a particularly compact module.

The module can also have the following features:

the module also comprises a second pivot connecting two connecting parts while allowing rotation of one of the connecting parts with respect to the other connecting part according to a second axis of rotation, during a rotation movement of the elbow module with respect to the back module corresponding to an internal or external rotation of the shoulder of the user, the first axis of rotation intersects the second axis of rotation, the module also comprises a third pivot connecting two connecting parts while allowing rotation of one of the connection parts with respect to the other connecting part according to a third axis of rotation, during a rotation of the elbow module with respect to the back module corresponding to a flexure or extension movement of the shoulder of the user, and in which the third axis of rotation intersects the second axis of rotation, the third axis of rotation intersects the second axis of rotation, the connecting parts include a second connecting part capable of connecting the shoulder module to an elbow joint of the elbow module, the second connecting part comprising two parts mounted sliding with respect to one another by means of a second slideway, the sliding of the parts with respect to one another allowing shortening or lengthening of the second connecting part during rotation of the elbow module with respect to the back module corresponding to a flexure or extension movement of the elbow of the user, the second slideway comprises an elastic return element tending to oppose a separation of the parts with respect to one another leading to a lengthening of the second connecting part, the module also comprises a four-bar mechanism connecting the back module to the first pivot, the four-bar mechanism comprising four bars, and four joints connecting the bars to each other while forming a deformable parallelogram, the four-bar mechanism comprises an elastic member extending along a diagonal of the parallelogram and connecting two opposite joints together, the module comprises a fourth pivot connecting one of the bars of the four-bar mechanism to a part of the back module and a fifth pivot connecting a parallel bar of the four-bar mechanism to one of the connecting parts.

The invention also relates to an exoskeleton structure comprising:
- a back module capable of being attached to the back of a user,
- an elbow module capable of being attached to the arm of a user, and
- a shoulder module as defined previously.

PRESENTATION OF THE DRAWINGS

Figure 3:
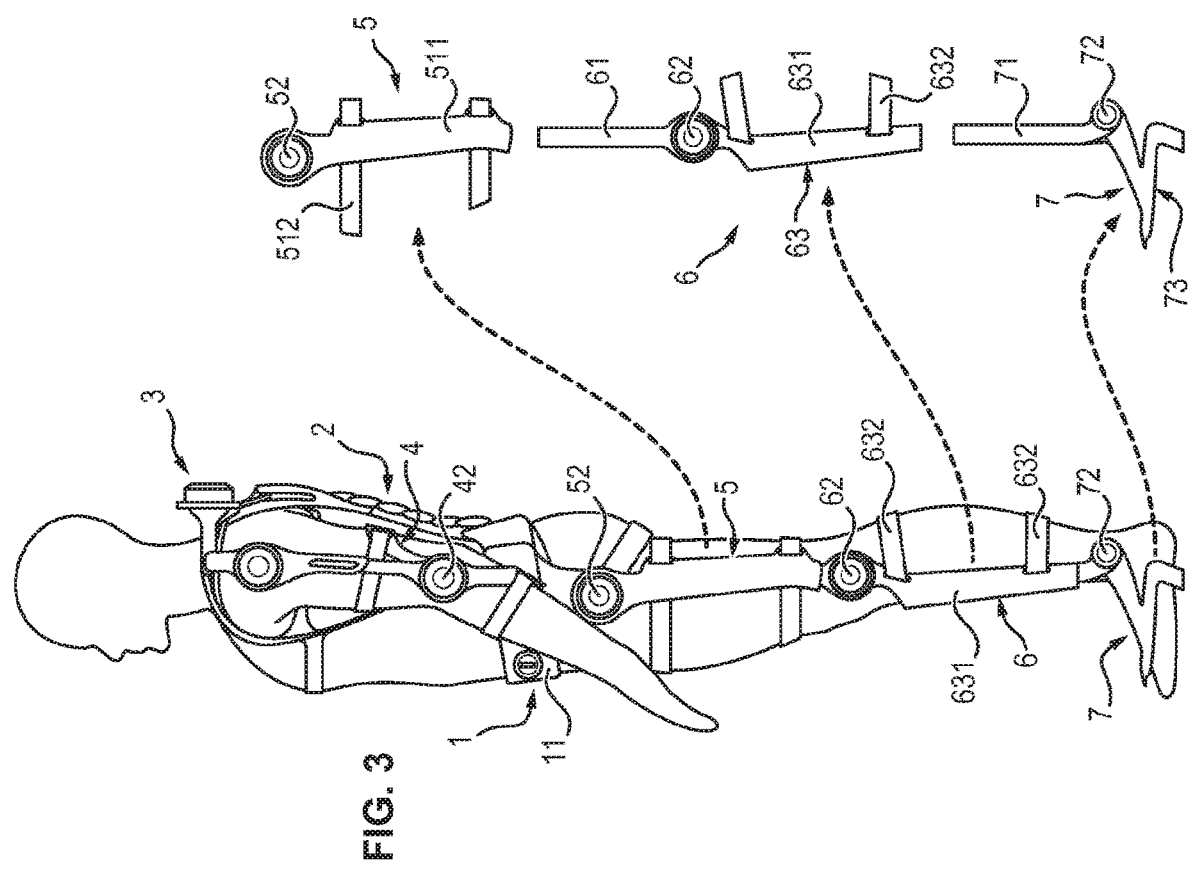
Figure 2:
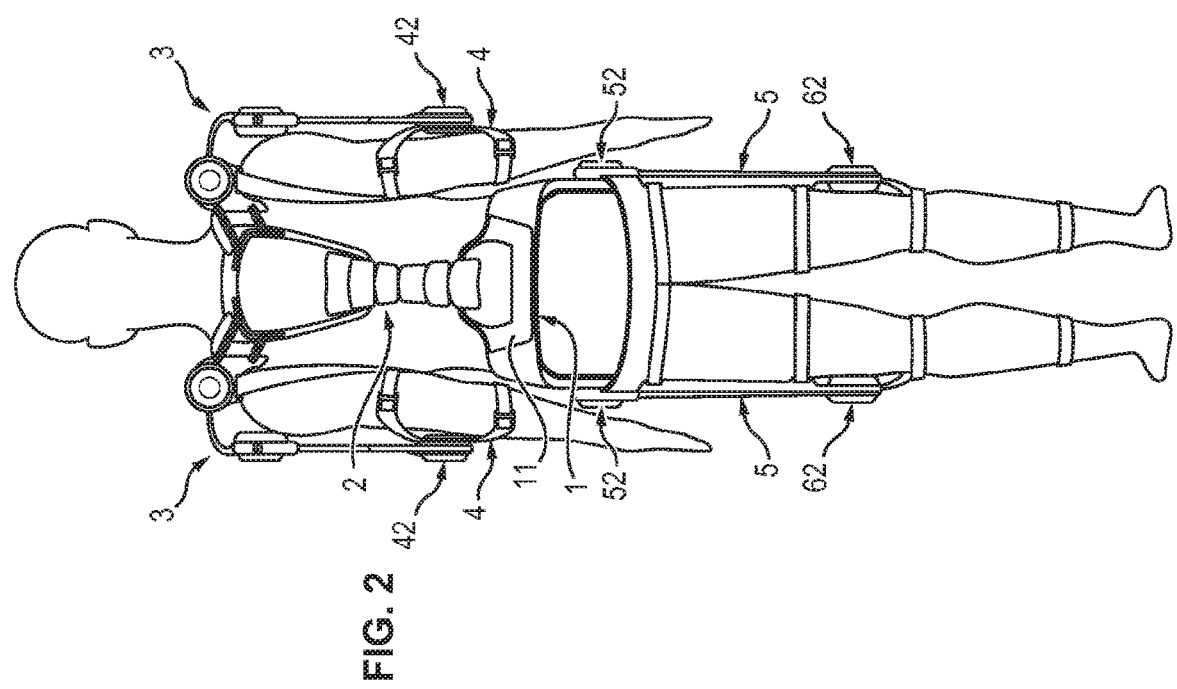
Figure 5:
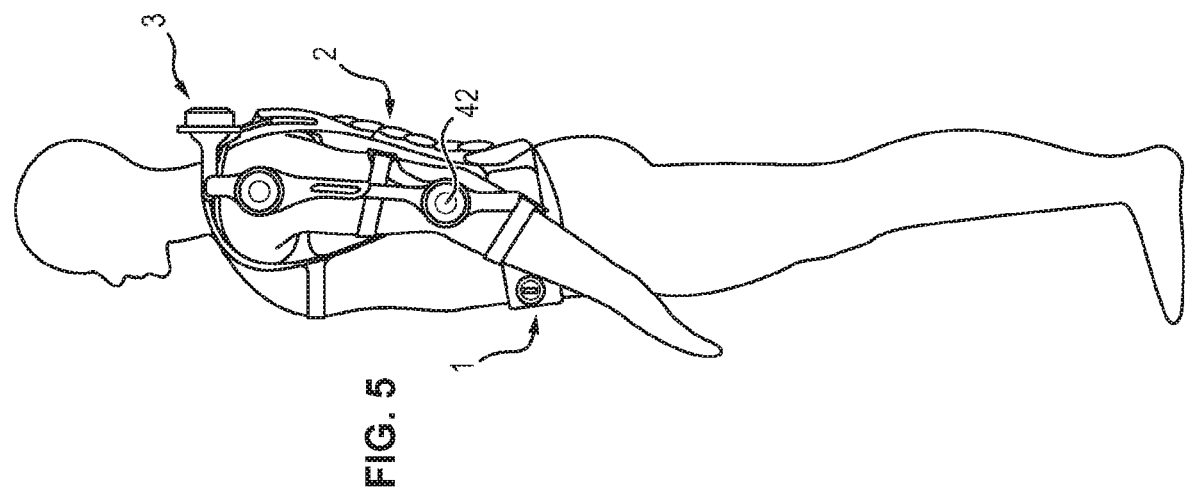
Figure 4:
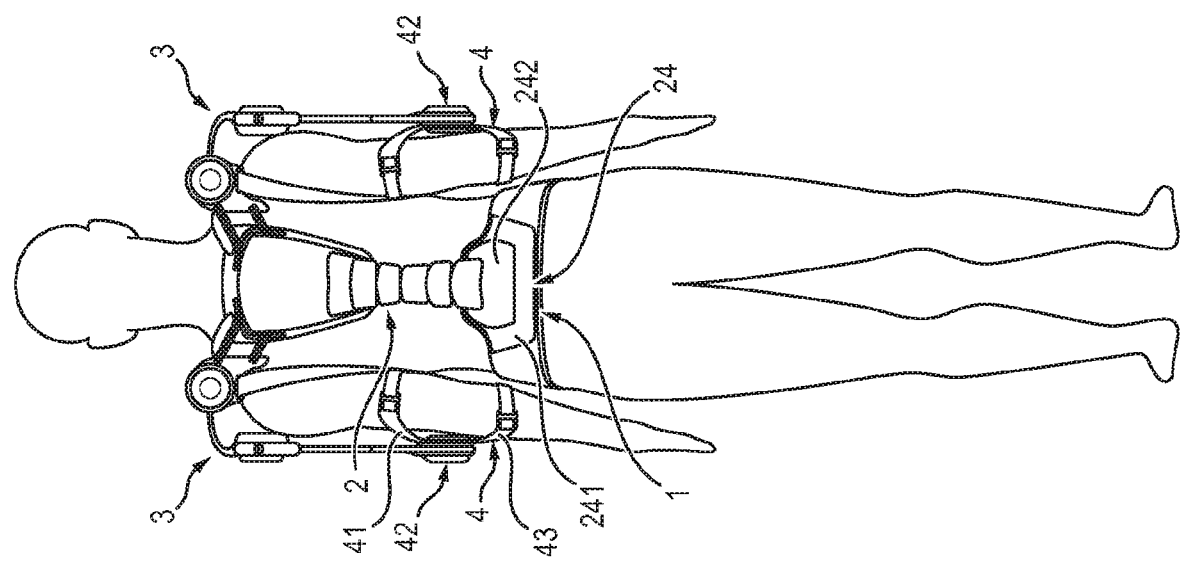
Figure 7:
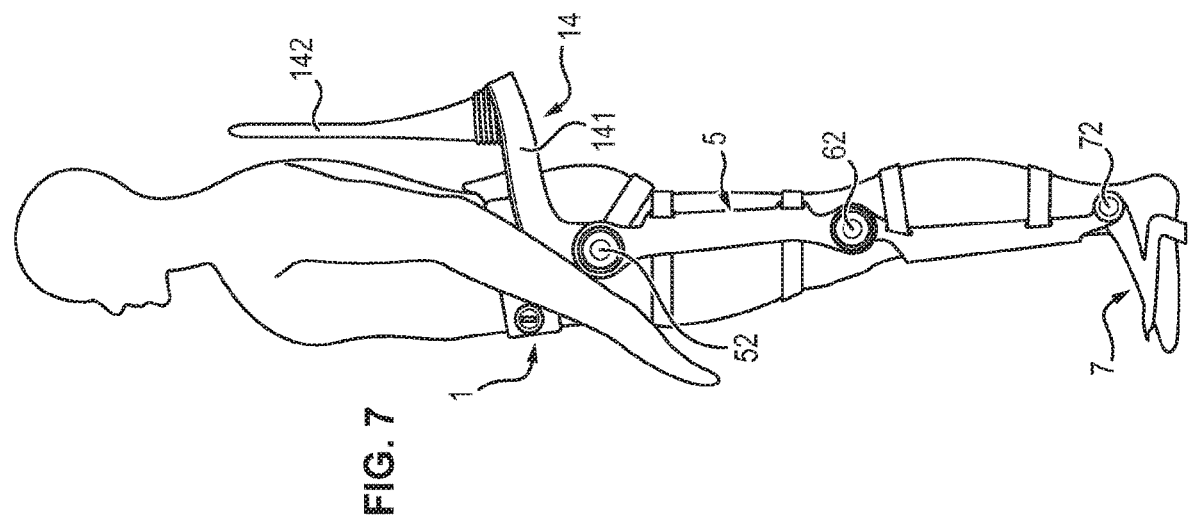
Figure 6:
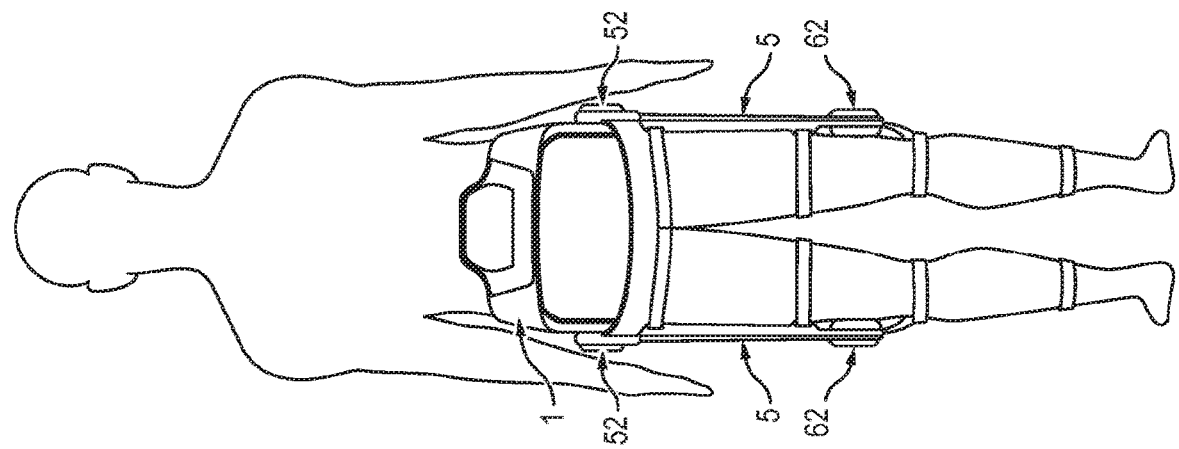
Figure 8A:
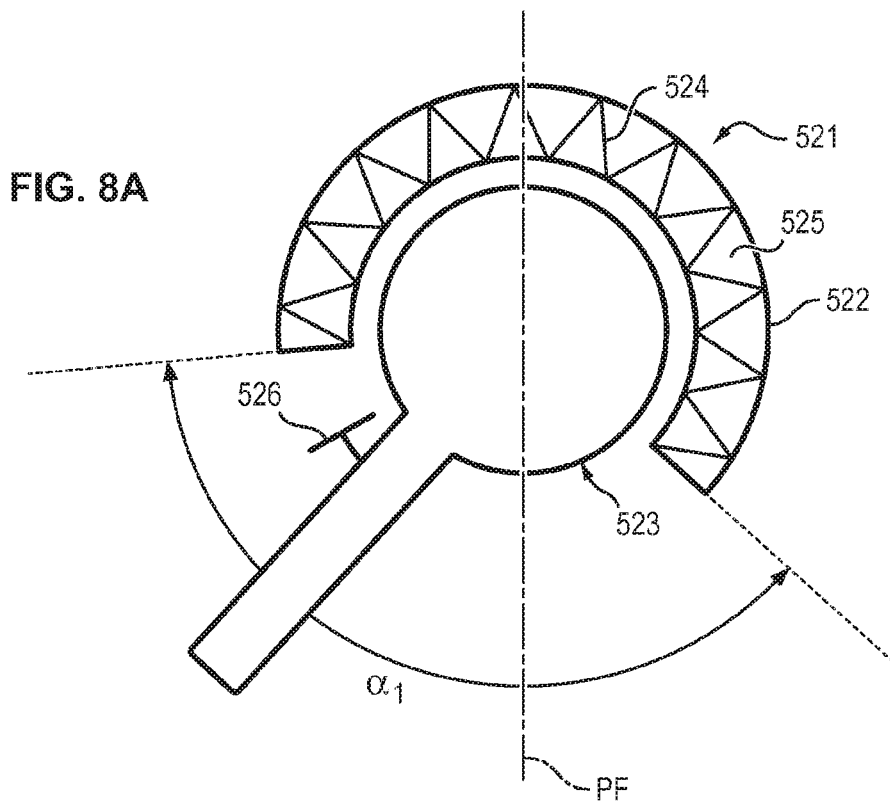
Figure 8B:
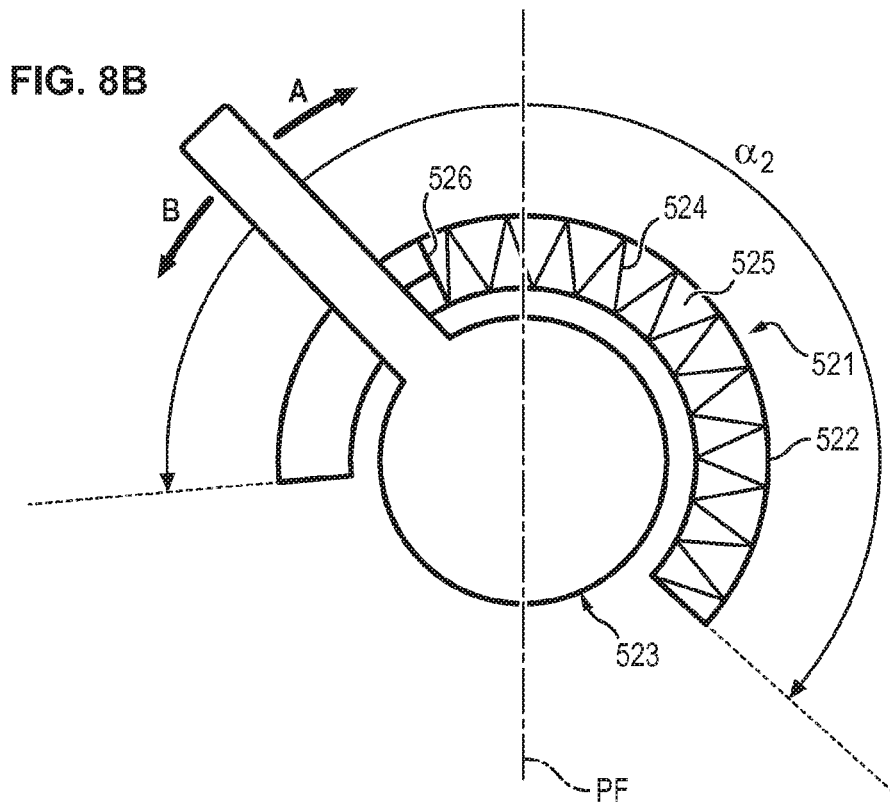
Figure 9:
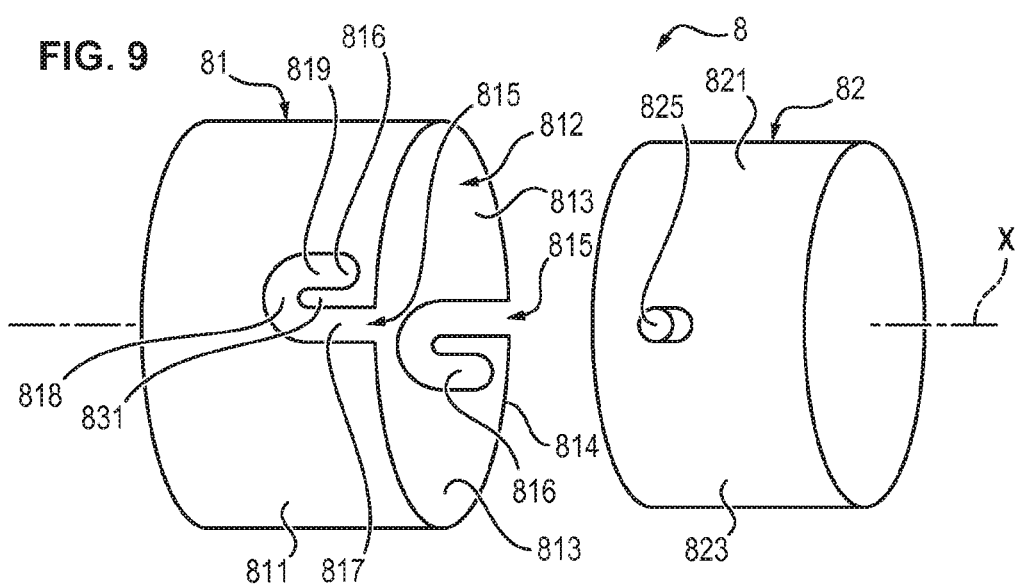
Figure 10A:
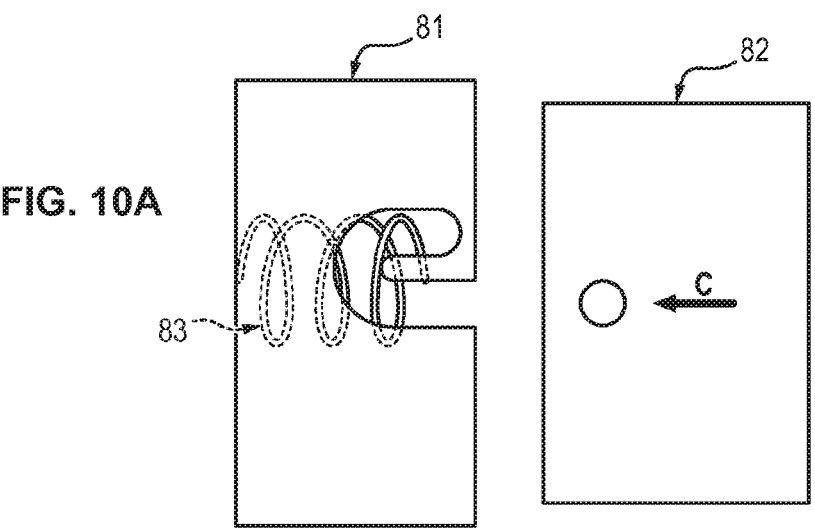
Figure 10B:
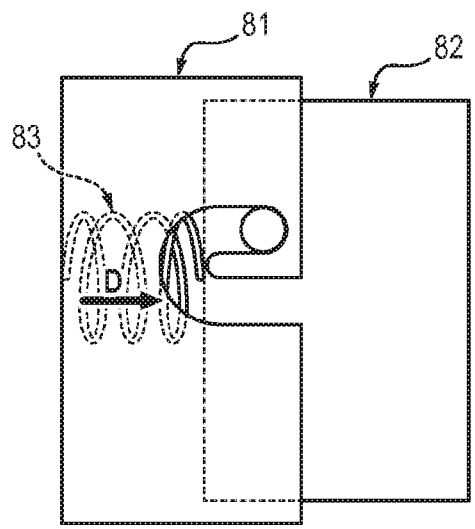
Figure 11:
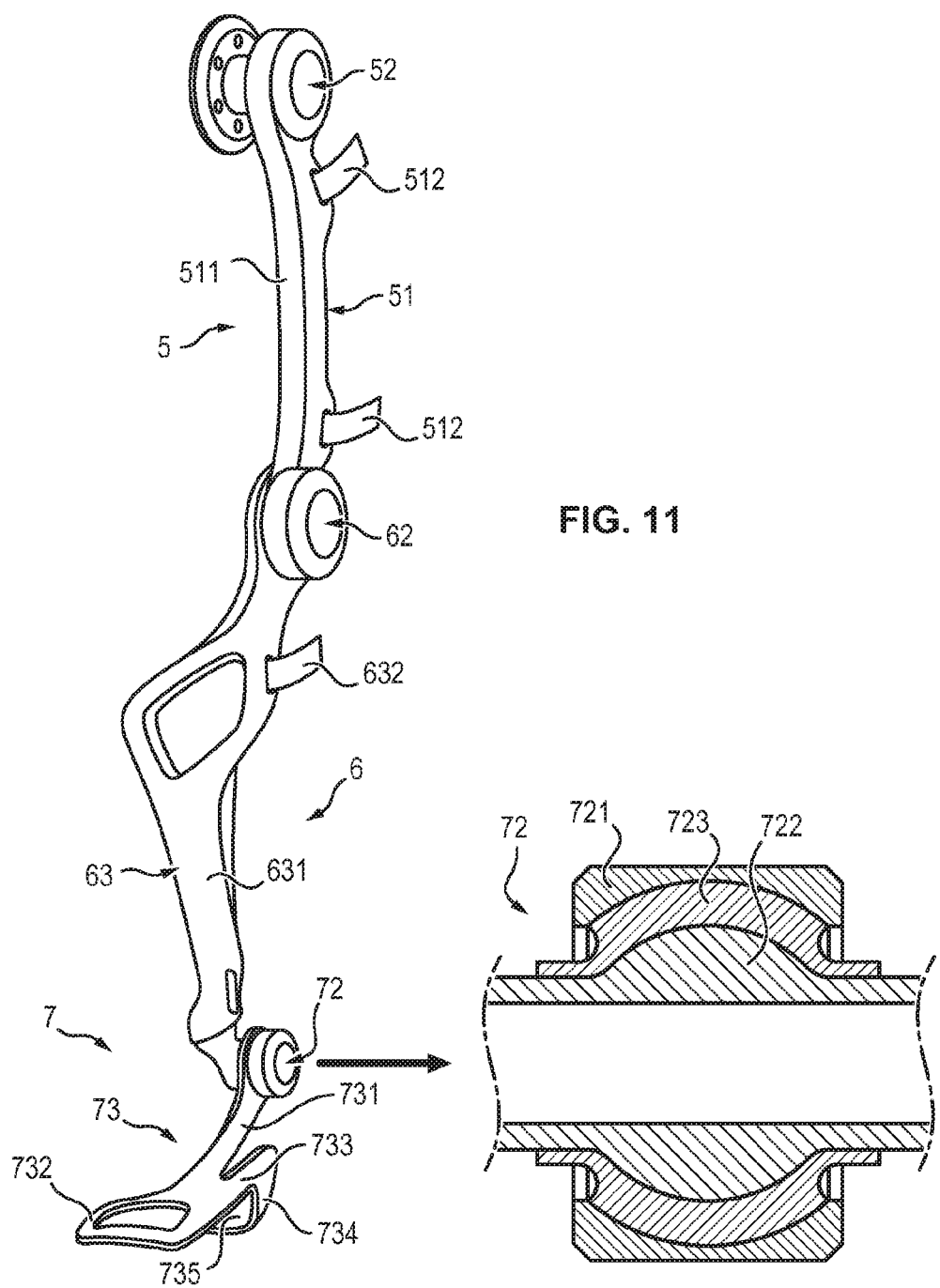
Figure 12A:
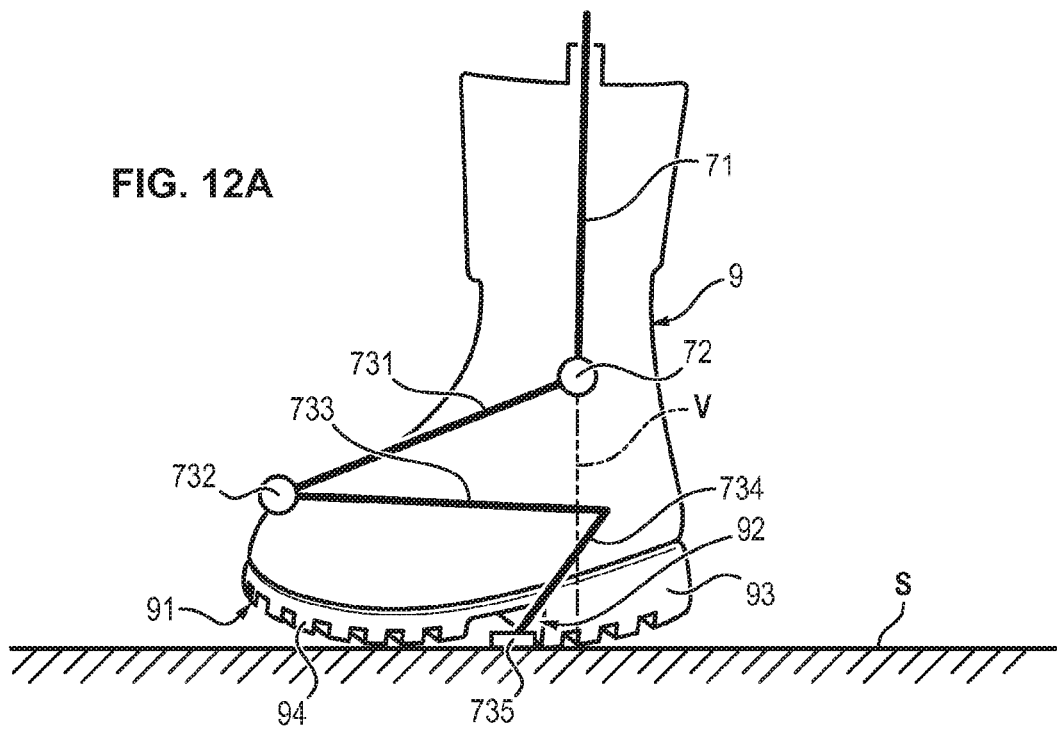
Figure 12B:
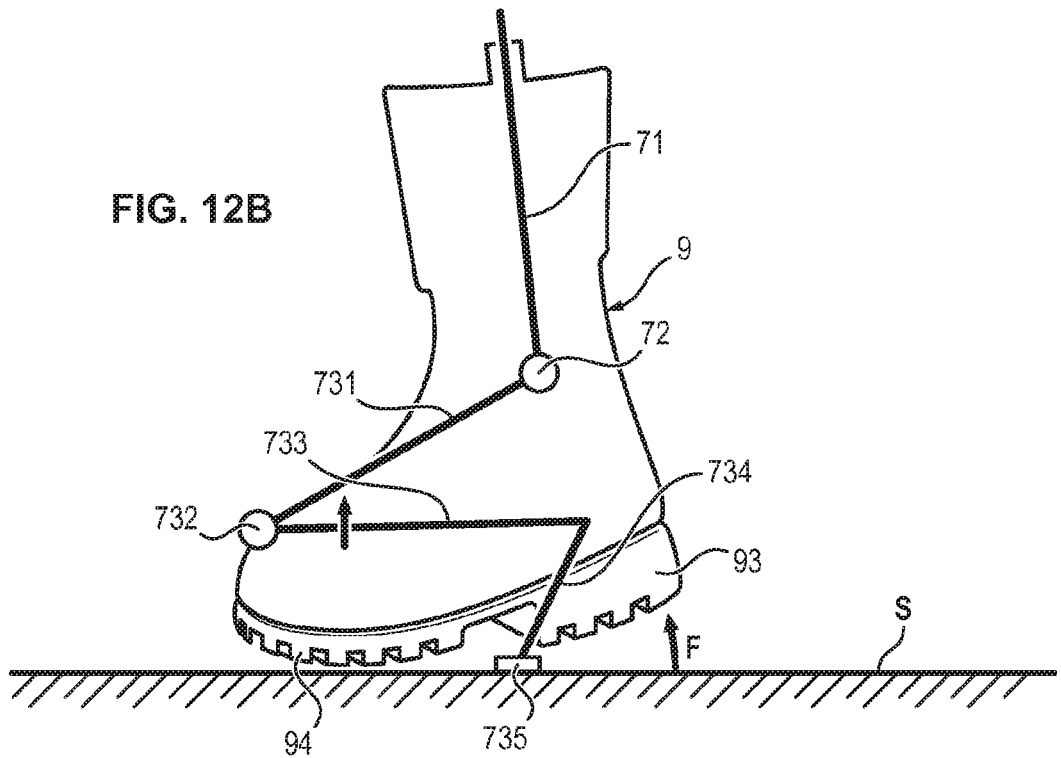
Figure 12D:
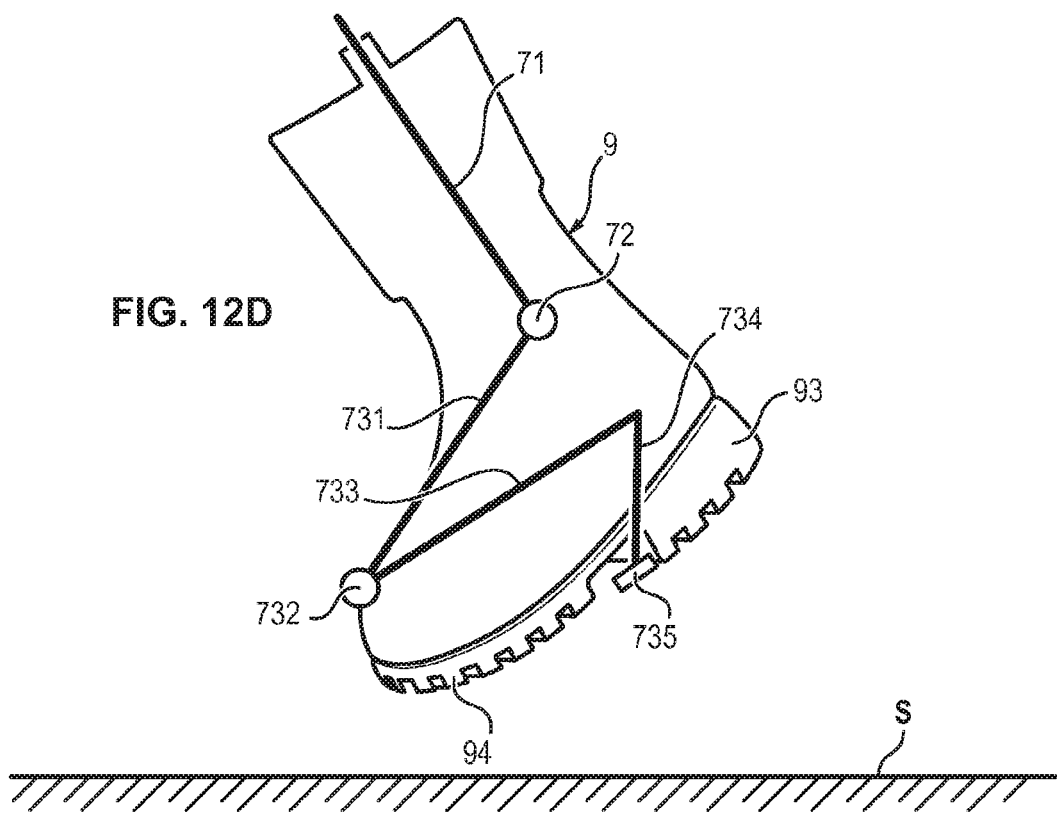
Figure 12E:
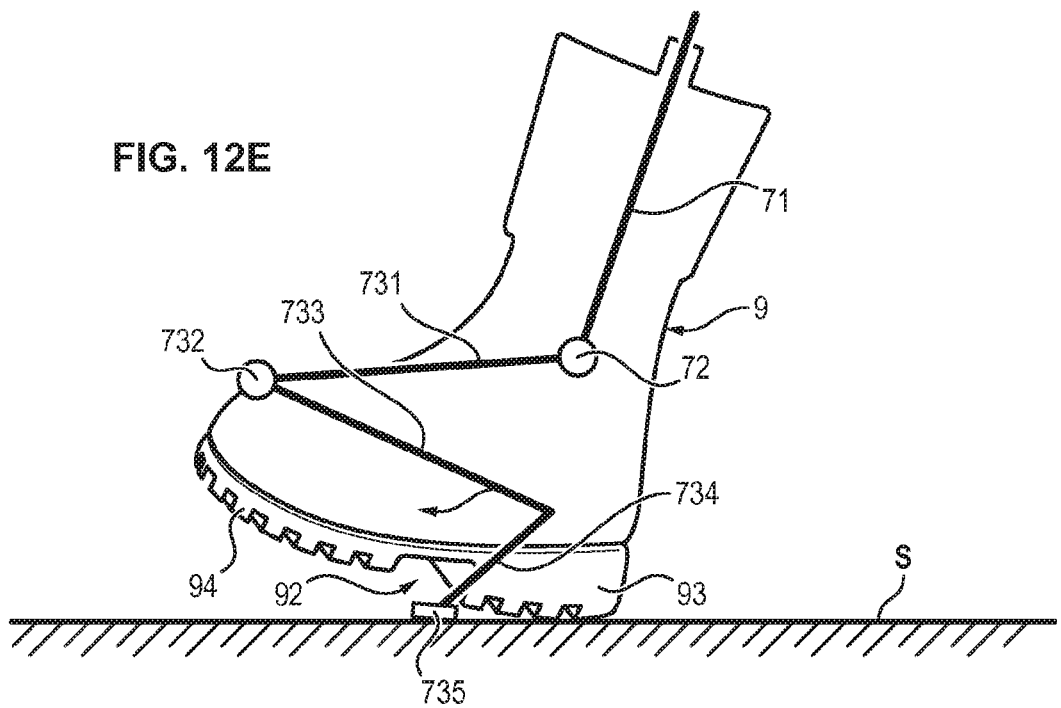
Figure 13:
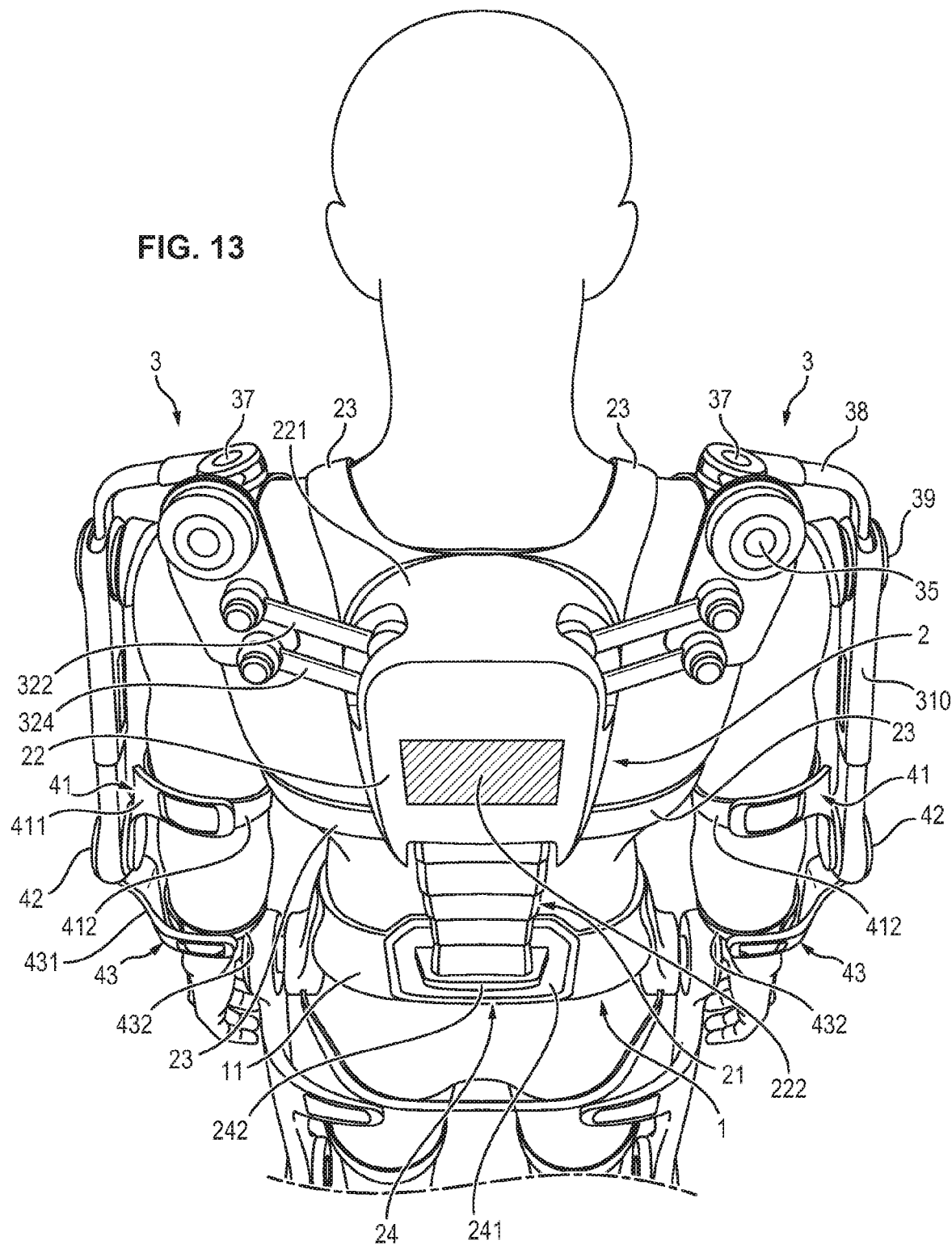
Figure 15:
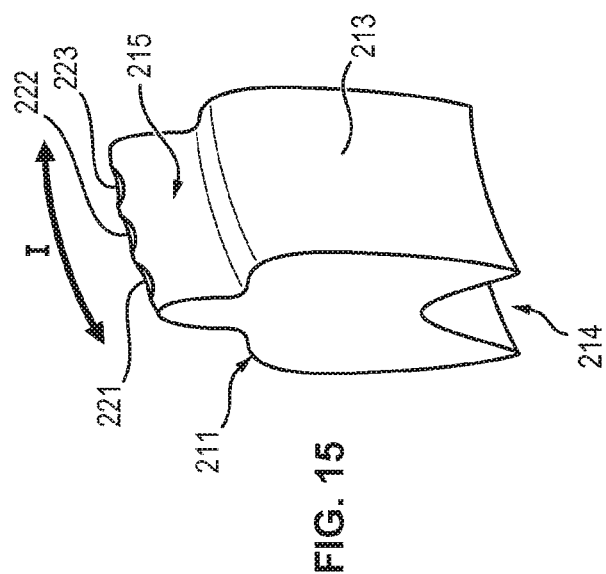
Figure 14:
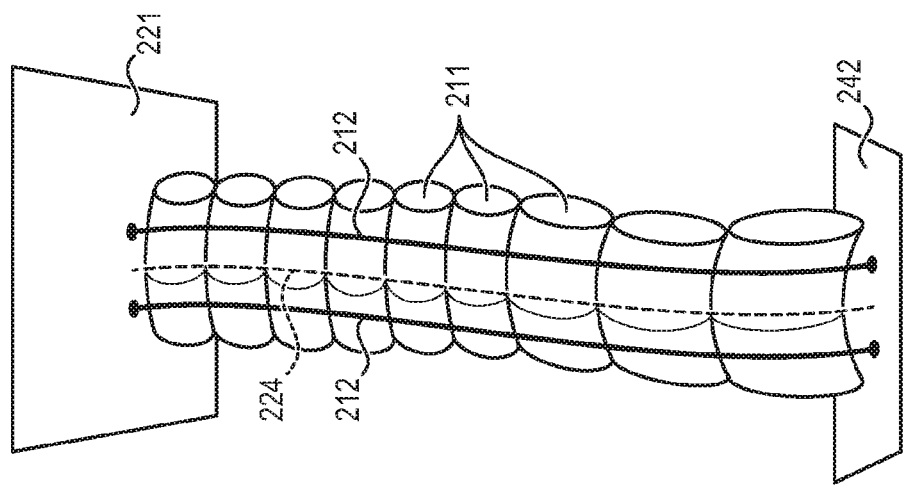
Figure 17:
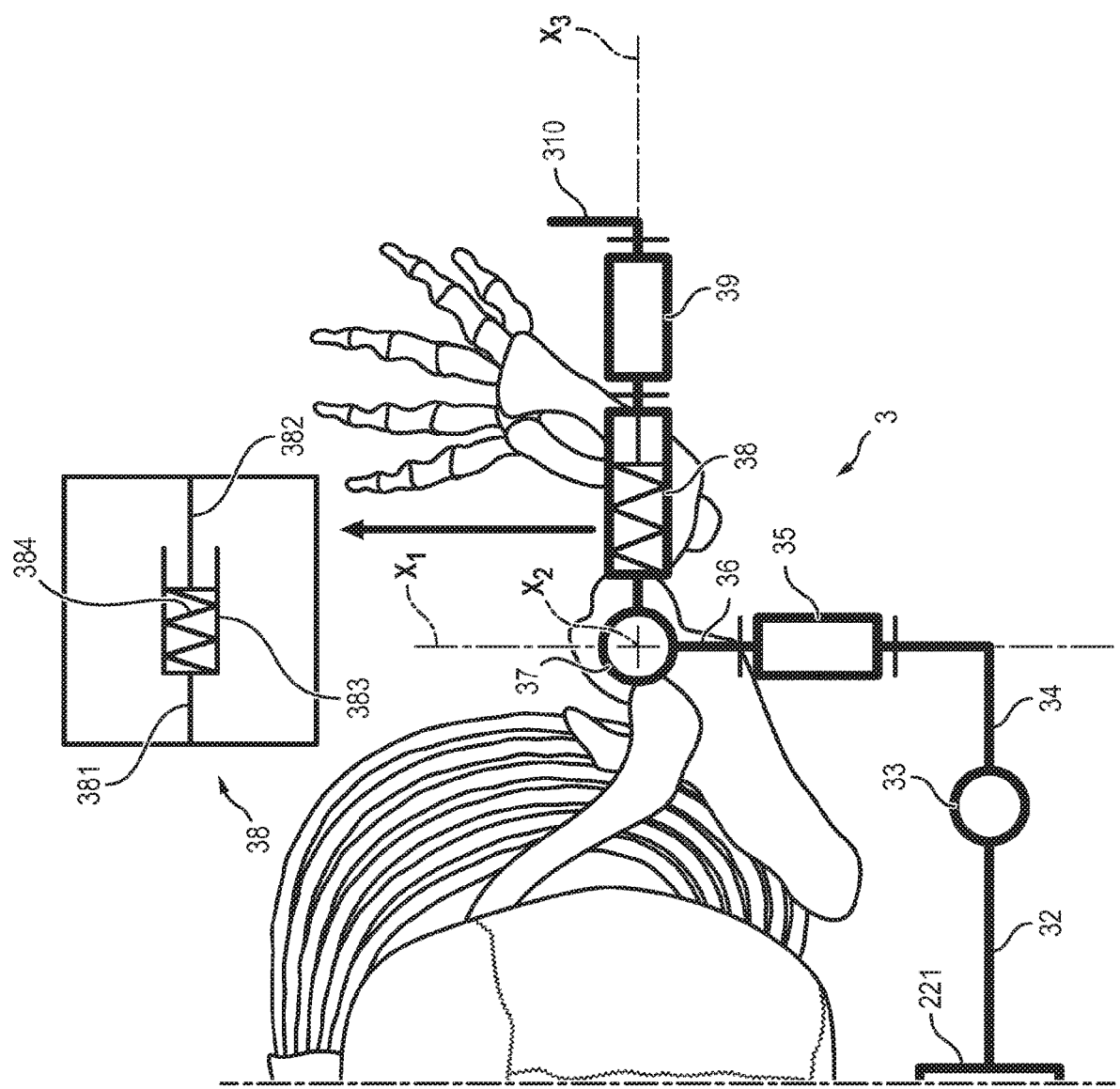
Figure 18:
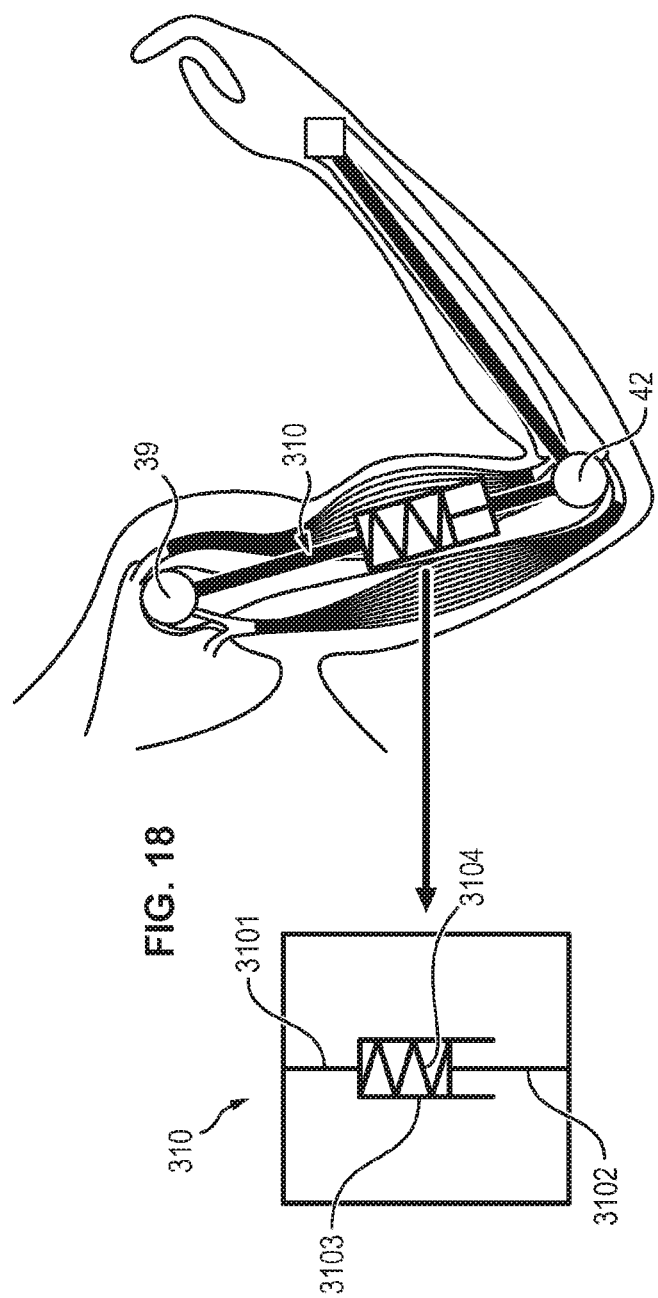
Figure 19:
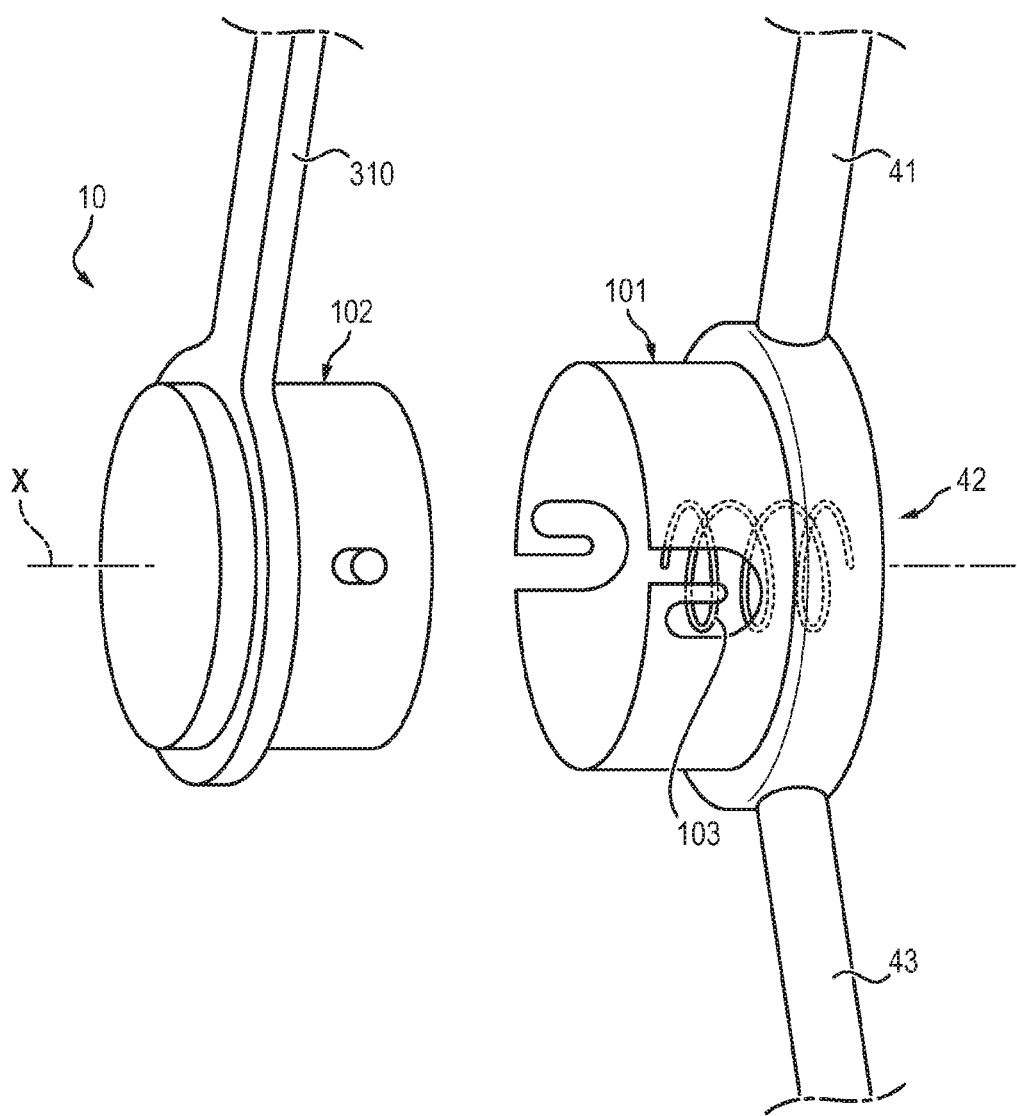
Figure 20:
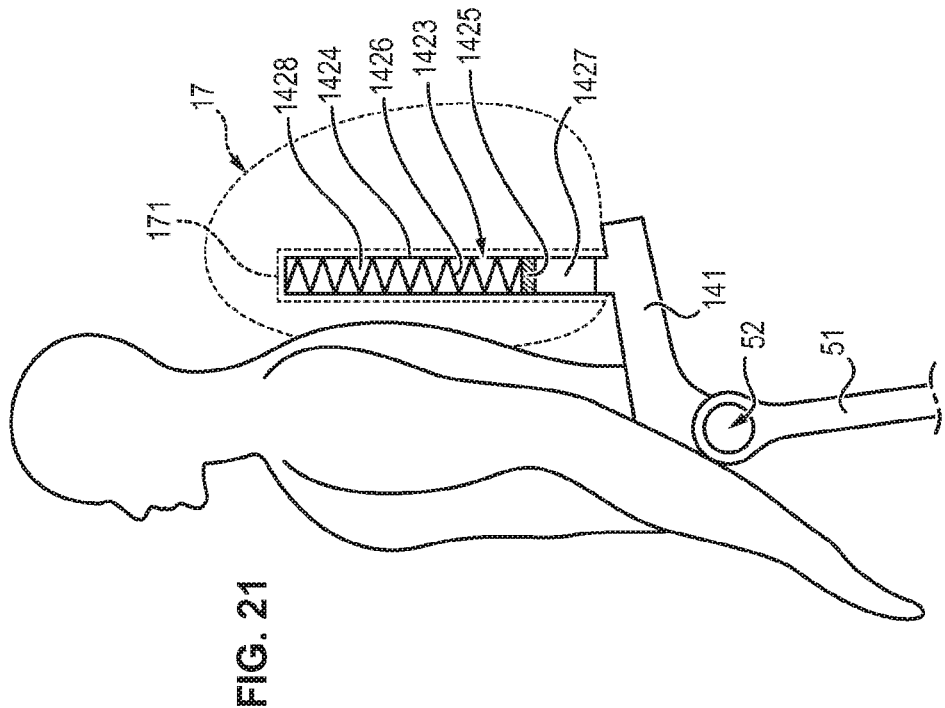
Figure 21:
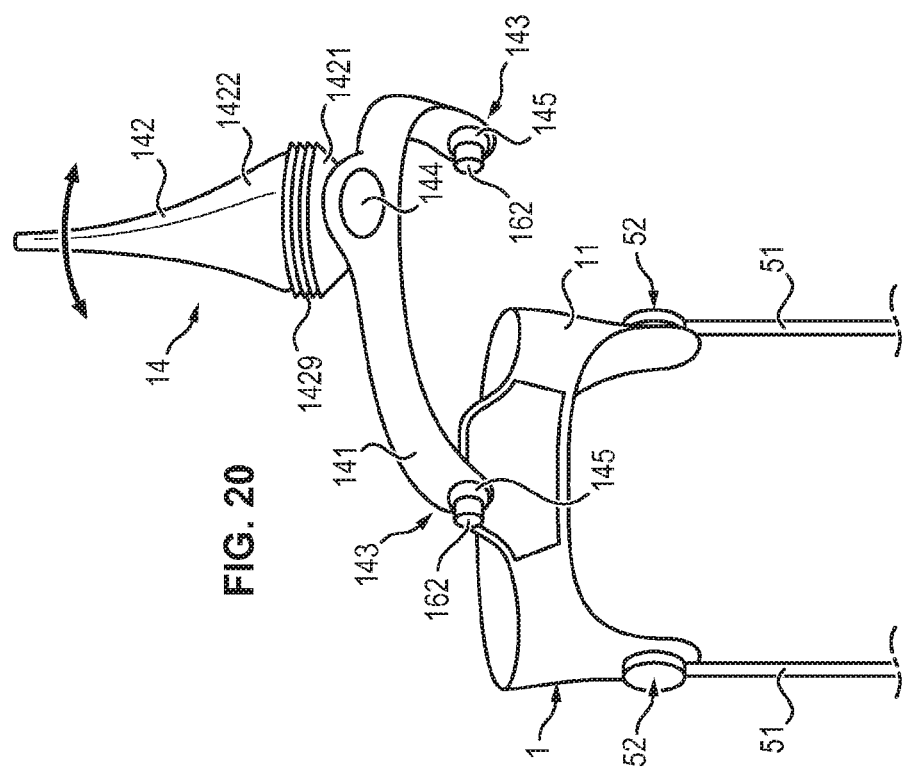
Figure 22:
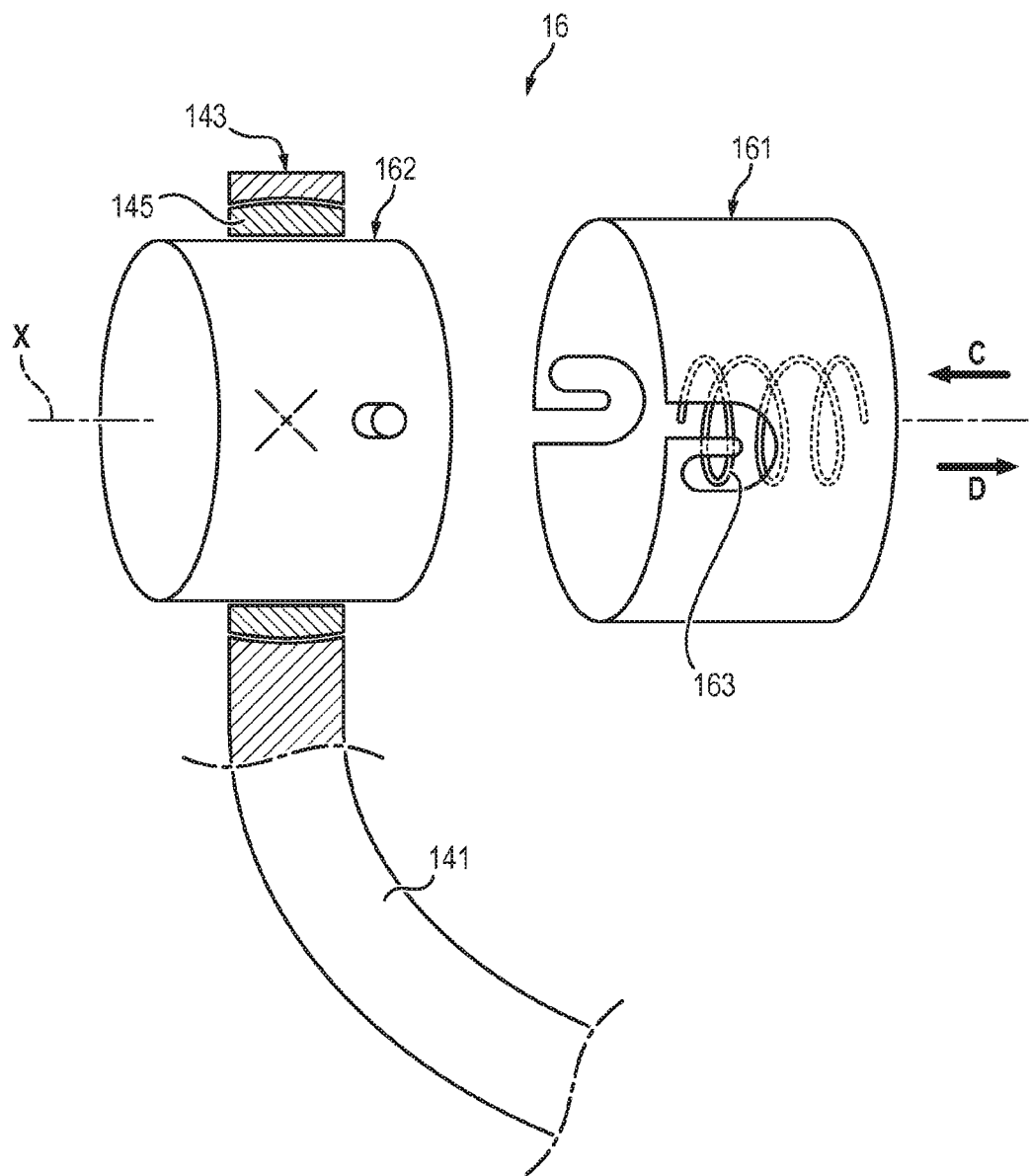

Other features and advantages will also be revealed by the description that follows, which is purely illustrative and not limiting and must be read with reference to the appended figures, among which:

FIG. 1 shows schematically, in front view, a user equipped with an exoskeleton structure conforming to a possible embodiment of the invention, FIGS. 2 and 3 show schematically, in back view and in profile view, the user equipped with the exoskeleton structure in conformity with a first possible configuration of the invention, FIGS. 4 and 5 show schematically, in back view and in profile view, the user equipped with the exoskeleton structure in conformity with a second possible configuration of the invention, FIGS. 6 and 7 show schematically, in back view and in profile view, the user equipped with the exoskeleton structure, in conformity with a third possible configuration of the invention, FIGS. 8A and 8B show schematically a hip joint connecting a hip module to the base module, FIG. 9 shows schematically an attachment device for attaching the hip module to the base module, FIGS. 10A and 10B show schematically the attachment device in the unlocked configuration and in the locked configuration respectively, FIG. 11 shows schematically lower modules of the exoskeleton structure, FIGS. 12A to 12E show schematically a shoe equipped with a foot module, during different phases of walking of the user, FIG. 13 shows schematically, in enlarged view, upper modules of the exoskeleton structure, FIG. 14 shows schematically a spinal column segment forming part of the back module, FIG. 15 shows schematically a vertebral element of the spinal column segment, FIGS. 16 to 18 show schematically a shoulder module, FIG. 19 shows schematically an attachment device for attaching the shoulder module to the elbow module, FIGS. 20 and 21 show schematically a backpack support module, FIG. 22 shows schematically an attachment device for attaching the backpack support module to each hip module.

DETAILED DESCRIPTION OF ONE EMBODIMENT

Modular Structure

In FIGS. 1 to 7, the exoskeleton structure shown comprises a base module 1, a back module 2, two shoulder modules 3, two elbow modules 4, two hip modules 5, two knee modules 6, two foot modules 7 and a backpack support module 14.

The exoskeleton structure illustrated in these figures can be used in different configurations, so as to obtain different exoskeletons adapted to different uses.

In a first configuration illustrated in FIGS. 1 to 3, the exoskeleton is formed by assembling the base module 1, the back module 2, the two shoulder modules 3, the two elbow modules 4, the two hip modules 5, the two knee modules 6 and the two foot modules 7.

In a second configuration illustrated in FIGS. 4 and 5, the exoskeleton is formed by assembling only the base module 1, the back module 2, the two shoulder modules 3 and the two elbow modules 4.

In a third configuration illustrated in FIGS. 6 and 7, the exoskeleton is formed by assembling only the base module 1, the two hip modules 5, the two knee modules 6, the two foot modules 7 and the backpack support module 14.

The three examples of configurations illustrated in these figures are obtained based on three different assemblies of the modular exoskeleton structure. However, other configurations would of course be practicable. In these different configurations, the exoskeleton is formed from one or more modules assembled together.

As illustrated in FIGS. 1 to 3, the base module 1 comprises a lumbar belt 11 capable of surrounding the lower trunk of the user. The lumbar belt 11 is disposed around the waist of the user, supported on the hips of the user. The base module 1 also comprises a first battery 12 allowing the different actuators of the structure to be supplied with electrical energy, and a control unit 13 programmed to control the different actuators. The first battery 12 and the control unit 13 are attached to the lumbar belt 11.

The back module 2 is adapted to be attached to the upper body of the user above the base module 1, along the back of the user.

The elbow modules 4 are adapted to be attached to the arms of the user, respectively to the right arm and to the left arm.

Each shoulder module 5 is adapted to connect the back module 2 to a respective elbow module 4.

The back module 2, the shoulder modules 3 and the elbow modules 4 form an assembly of upper modules which have the function of assisting the user with all the forces that he produces with his upper body, for example when he carries out repetitive work with his upper body.

The hip modules 5 are adapted to be attached to the thighs of the user, respectively to the right thigh and to the left thigh of the user.

The knee modules 6 are adapted to be attached to the calves of the user, respectively to the calf of the right leg and to the calf of the left leg of the user.

The foot modules 7 are adapted to be attached to the feet of the user, respectively to the right foot and to the left foot.

The hip modules 5, the knee modules 6 and the foot modules 7 form an assembly of lower modules which have as their function to assist the user in the forces that he produces with his lower body, particularly when walking or when he carries or moves loads.

It will be noted that the hip modules 5 are symmetrical to one another. The hip modules 5 therefore comprise portions that are identical or similar.

Likewise, the knee modules 6 are symmetrical to one another and comprise identical or similar portions.

The same is true of the foot modules 7, of the shoulder modules 3 and of the elbow modules 4.

Hip Module

As illustrated in FIGS. 1 to 3, each hip module 5 comprises a femoral portion 51 capable of being attached to the thigh of the user, and a hip joint 52.

The femoral portion 51 comprises a femoral segment 511 designed to extend along the thigh of the user and attachment straps 512 capable of surrounding the thigh of the user to attach the femoral segment 511 to the thigh.

Each hip module 5 is connected to the base module 1 through a respective hip joint 52. More precisely, the hip joint 52 allows the femoral portion 51 of the hip module 5 to be connected to the belt 11 of the base module 1.

Hip Joint

As illustrated in FIGS. 8A and 8B, the hip joint 52 comprises a hip actuator 521 allowing assistance to the user during flexure or extension movement of the hip of the user. The actuator 521 comprises a stator 522 and a rotor 523 capable of being driven in rotation with respect to the stator 522 when the stator 522 is supplied with electrical energy to drive in rotation the hip module 5 with respect to the base module 1 during a flexure or extension movement of the hip.

The hip joint 52 also comprises an elastic return element 524 arranged to exert an elastic return force which assists the rotor 523 when the user stands up from a seated or squatting position. The elastic return element 524 can comprise a preloaded spring disposed between the stator 522 and the rotor 523, in a guide groove 525 provided between the stator 522 and the rotor 523.

More precisely, the elastic return element 524 is arranged so that:

in a first angular range $\alpha_1$ of movement of the rotor 523 with respect to the stator 522, corresponding to an angular range in which the rotor 523 is located when the user walks or runs (FIG. 8A), the elastic return element 524 does not exert any return force on the rotor 523, and in a second angular range $\alpha_2$ of movement of the rotor 523 with respect to the stator 522, corresponding to an angular range in which the rotor 523 is located when the user sits or squats (FIG. 8B), the elastic return element 524 exerts a return force on the rotor 523.

To this end, the hip joint 52 comprises a tappet 526 mounted fixedly on the rotor 523, the tappet 526 being capable of loading the elastic element 525 in compression only when the rotor 523 is located in the second angular range $\alpha_2$.

In this second range, the return force exerted by the elastic element 524 tends to oppose a rotation of the rotor 523 with respect to the stator 522 in a first direction of rotation (arrow A) and to assist a rotation of the rotor 523 with respect to the stator 522 in a second direction of rotation (arrow B), opposite to the first direction of rotation.

The first direction of rotation (arrow A) is the direction of rotation of the rotor 523 with respect to the stator 522 when the user bends the thigh with respect to the upper body (when the user sits or squats).

The second direction of rotation (arrow B) is the direction of the rotor 523 with respect to the stator 522 when the user extends the thigh with respect to the upper body (when the user rises after having sat or squatted).

In other words, when the rotor 523 is located in the second angular range $\alpha_2$, the elastic return element 524 exerts on the rotor 523 a return force which tends to oppose a rotation of the hip module 5 with respect to the base module 1 during a flexure movement of the hip and assist a rotation of the hip module 5 with respect to the base module 1 during an extension movement of the hip.

The first angular range $\alpha_1$ corresponds to a flexure or extension movement of the hip comprised for example between +60 degrees and −15 degrees with respect to a frontal plane PF of the user.

The second angular range $\alpha_2$ corresponds to a flexure or an extension movement of the hip greater than +90 degrees with respect to the frontal plane PF of the user.

Thus, in the first angular range $\alpha_1$ of movement of the rotor of the actuator, the user benefits from active assistance through the actuator 521, which in the second angular range $\alpha_2$ of movement of the rotor of the actuator, the user benefits totally or as a supplement from passive assistance through the elastic return element 524.

In this manner, the power delivered by the actuator 521 is limited in the second angular range of movement.

The elastic element 524 can be supported against an abutment allowing the spring to be kept pre-loaded. The position of the abutment with respect to the stator can be adjustable, by means of screws for example, so as to be able to modify the angular ranges defined above.

Device for Attaching the Hip Module to the Base Module

The exoskeleton structure also comprises an attachment device 8 allowing the hip module 5 to be attached to the base module 1.

FIGS. 9, 10A and 10B show schematically the attachment device 8. In the embodiment illustrated in these figures, the attachment device 8 is a so-called "bayonet type" attachment device. The attachment device 8 is capable of passing from an unlocked configuration (illustrated in FIG. 10A) in which the hip module 5 is detached from the base module 1, to a locked configuration (illustrated in FIG. 10B) in which the hip module 5 is attached to the base module 1.

The attachment device 8 comprises a first part 81 mounted fixedly on the base module 1 and a second part 82 mounted fixedly on the hip module 5. More precisely, the first part 81 is attached to the belt 11. The second part 82 is attached to the stator 522 of the actuator 521.

The second part 82 is capable of being snapped into the first part 81, so as to allow the reversible attachment of the hip module 5 to the base module 1.

The first part 81 comprises a body 811 having an insertion opening 812, and having an internal guide surface 813, with a cylinder-of-revolution shape. The body 811 has a free edge 814 with a circular shape delimiting the insertion opening 812. The first part 81 comprises two slots 815 formed in the body 812 at diametrically opposite positions. Each slot 815 extends from the free edge 814 of the first part 81 and has an end 816. Moreover, each slot 815 has a U (or hairpin) shape and comprises two straight portions 817, 819 and a curved portion 818. The first straight portion 817 extends from the free edge from the entrance to the slot 815 to the curved portion 818, in a direction parallel to the axis X of the internal guide surface 813. The curved portion 818 extends from the first straight portion 817 to the second straight portion 819, forming a bend. The second straight portion 819 extends from the curved portion to the end 816. The portions thus delimit a boss 831 in the body 811 of the first part 81.

The second part 82 comprises a body 821 having an external guide surface 823 with a cylinder-of-revolution shape. The second part 82 is capable of being inserted into the first part 81 through the opening 812. The insertion of the second part 82 into the first part 81 is guided by the cylindrical surfaces 813 and 823 in contact with one another. The second part 82 comprises two radial pins 825 situated in diametrically opposite positions, and protruding from the external surface 823. The radial pins 825 are capable of being engaged in the slots 815 of the first part 81 when the second part 82 is inserted into the first part 81.

The first part 81 is capable of being inserted into the second part 82 in a first direction (arrow C) parallel to the axis X, corresponding to an insertion direction.

The attachment device 8 also comprises an elastic return element 83, in the form of a spring, capable of loading the second part 82 in a second direction (arrow D), opposite to the first direction. The elastic element 83 thus tends to oppose the insertion of the second part 82 into the first part 81.

In the unlocked position (FIG. 10A), the second part 82 is disengaged from the first part 81.

In the locked configuration (FIG. 10B), the second part 82 is engaged in the first part 81.

The locking of the attachment device 8 is accomplished by inserting the second part 82 into the first part 81 through the insertion opening 812. During this insertion, each pin 825 is introduced into a respective slot 815.

Then the second part 82 is moved with respect to the first part 81 so as to cause each pin 825 to slide in the slot 815 in which it is received. Due to the shape of the slot 815, the sliding of the pin 825 from the entrance of the slot 815 to the end 816 of the slot 815 necessitates a combined movement of translation, parallel to the axis X, and rotation around the axis X, of the second part 82 with respect to the first part 81. The second part 82 is first translated with respect to the first part 81 in the first direction (insertion direction) counter to the return force exerted by the elastic element 83. Then the second part 82 is translated in the second direction, opposite to the first direction, while undergoing rotation with respect to the first part 81 around the axis X.

Once the pin 825 is positioned at the end 816 of the slot 815, the second part 82 is blocked in rotation with respect to the first part 81 by the boss 831. Moreover, the elastic element 83 loads the second part 82 in the second direction, which has the effect of retaining the pin 825 in abutment against the end 816 of the slot 815. The elastic element 83 and the boss 831 block the pin 825 in the slot 815 and prevent disengagement of the pin 815 from the slot 825.

In this manner, the second part 82 is held snapped into the first part 81.

The un-snapping of the second part 82 is obtained by carrying out the reverse operation, that is by causing each pin 815 to slide along the reverse path from the end 816 of the slot 815 to the entrance of the slot 815. The sliding of the pion 815 from the end 816 of the slot 815 to the entrance of the slot 815 again necessitates a combined translation and rotation movement of the second part 82 with respect to the first part 81. The second part 82 is first translated with respect to the first part 81 in the first direction (insertion direction) counter to the return force exerted by the elastic element 83 while undergoing reverse rotation with respect to the first part 81. Then the second part 82 is translated with respect to the first part 81 in the second direction.

Moreover, the first part 81 and the second part 82 each comprise electrical contacts capable of electrically connecting the first battery 12 and the control unit 13 of the base module 1 to the actuator when the second part 82 is in the locked configuration in the first part 81.

Knee Module

As illustrated in FIG. 3, each knee module 6 comprises a connecting bar 61, a knee joint 62 and a tibial portion 63 capable of being attached to the calf of the user.

The connecting bar 61 is capable of sliding inside the femoral segment 511 of the hip module 5, so as to attach the knee module 6 to the hip module 5, while allowing adjustment of the distance between the hip joint 52 and the knee joint 62. A set screw allows the immobilization of the connecting bar 61 with respect to the femoral segment 511.

The tibial portion 63 comprises a tibial segment 631 designed to extend along the calf of the user and attachment straps 632 capable of surrounding the shaft of the user to attach the segment 631 to the calf.

Once the knee module 6 is attached to the hip module 5, the tibial portion 51 is connected to the femoral portion 51 through the knee joint 62. The knee joint 62 allows a rotation of the tibial portion 63 with respect to the femoral portion 51 in a plane parallel to the sagittal plant of the user (corresponding to a flexure or extension of the knee of the user).

The knee joint 62 can comprise an actuator allowing assistance to the user during flexure or extension movement of the knee.

The actuator of the knee joint 62 can be identical to the actuator 521 of the hip joint illustrated in FIGS. 8A and 8B. In particular, the actuator can comprise a stator, a rotor capable of being driven in rotation with respect to the stator to drive in rotation the knee module with respect to the hip module during a flexure or extension movement of the knee, and an elastic return element arranged to exert an elastic return force which assists the actuator when the user rises from a seated or squatting position. The elastic return element can comprise a pre-loaded spring disposed between the stator and the rotor, in a guide groove provided between the stator and the rotor.

However, in the case of a knee joint actuator, the angular ranges are different. The first angular range $\alpha_1$ corresponds to a flexure or extension movement of the knee comprised for example between +15 degrees and −60 degrees with respect to a frontal plane PF of the user. The second angular range $\alpha_2$ corresponds to a flexure or extension movement of the knee less than −60 degrees with respect to the frontal plane PF of the user.

The adjustment of the angular ranges can be obtained by modifying the position of the abutment to which the spring is applied, with respect to the stator.

Foot Module

As illustrated in FIG. 3, the foot module 7 is attached to the knee module 6.

The foot module 7 comprises a connecting bar 71, an ankle joint 72 and a foot portion 73 capable of being attached to the foot of the user.

The connecting bar 71 is capable of sliding inside the tibial segment 631 of the knee module 6 so as to attach the foot module 7 to the knee module 6, while allowing adjustment of the distance between the knee joint 62 and the ankle joint 72. A set screw allows immobilizing the connecting bar 71 with respect to the tibial segment 631.

As illustrated in FIG. 11, the foot portion 73 comprises a first segment 731, a first support plate 732, a second segment 733, a third segment 734 and a second support plate 735.

The ankle joint 72 allows rotation of the foot module 7 with respect to the knee module 6 during a flexure or extension movement, during a pronation or supination movement and during an eversion or inversion movement of the ankle of the user.

The ankle joint 72 comprises a first frame 721, a second frame 722 capable of turning with respect to the first frame 721 during a rotation movement of the foot of the user with respect to the calf, and an elastic element 723 disposed between the frames 721 and 722.

The first frame 721 is mounted fixedly on the connecting bar 71 of the foot module 7 and the second frame 722 is mounted fixedly on the first segment 731 of the foot portion 73.

The elastic element 723 comprises a ring formed from an elastomeric material, pre-compressed between the first frame 721 and the second frame 722. The elastic element 723 is capable of exerting a return force tending to oppose the relative rotation of the second frame 722 with respect to the first frame 721.

The first segment 731 connects the ankle joint 72 to the first support plate 732. More precisely, the first segment 731 has a first end attached to the second frame 722 and a second end attached to the first support plate 732.

The second segment 733 and the third segment 734 connect the first support plate 732 to the second support plate 735 while forming an angle between them.

The second support plate 735 can have, on its lower surface designed to be in contact with the ground, an anti-skid coating, made for example of grooved rubber.

In FIGS. 12A to 12D, the foot module 7 is used with a boot 9, of the "ranger" or "combat boot" type for example. The boot 9 is designed to support a load applied on top of the boot 9 which can go up to 40 kilograms. The boot 9 can also comprise a shell protecting the front of the foot and/or reinforcing elements made of metal.

As illustrated in FIG. 12A, the first support plate 732 is designed to support the top of the boot 9 of the user.

The second support plate 735 is designed to be supported on the ground S when the user is standing on the ground. The second support plate 735 is arranged so that it is disposed below the sole 91 of the boot 9 of the user, in a recess 92 formed in the sole between the heel 93 and the forefoot 94.

The first segment 731 and the second segment 733 form a V-shaped spring. The spring is capable of being compressed when the sole 91 of the boot 9 is in contact with the ground (segments 731 and 733 move closer together) and to be expanded when the sole 91 of the boot 9 is not in contact with the ground S (segments 731 and 733 move away from each other).

The second segment 733 and the third segment 734 are connected to one another by an angle situated below the ankle joint 72. More precisely, the vertical axis V passing through the center of rotation of the ankle joint 72 intersects the two segments 733 and 734, when the user is in the standing position. This position of the segments 733 and 734 with respect to the ankle joint 72 allows the creation of a downward deformation of the foot portion 73, and therefore ensures that the foot portion 73 tends to press on the front of the boot 9, and not to raise the front of the boot.

FIGS. 12A to 12E illustrate different phases of the walking cycle of the user.

In FIG. 12A, the sole 91 of the boot 9 is in contact with the ground S. During this phase, the second support plate 735 is in contact with the ground S. The spring formed by the segments 731 and 733 is compressed so that the weight exerted on the foot module 7 is transferred to the ground S via the second support plate 735.

In FIG. 12B, the heel 93 of the boot 9 detaches from the ground S. During this phase, the spring formed by the segments 731 and 733 expands. As it expands, the spring exerts on the foot module 7 an upward return force F which assists the user in lifting the foot.

In FIG. 12C, only the front 94 of the sole 91 of the boot 9 is in contact with the ground S. The spring formed by the segments 731 and 733 is expanded. The weight exerted on the foot module 7 is then transferred to the boot 9 via the first support plate 732. As long as the boot 9 is in contact with the ground, the weight is transferred to the ground via the boot 9.

In FIG. 12D, once the foot has been lifted from the ground S, the weight is exerted mainly on the other foot module 7 of the exoskeleton structure.

In FIG. 12E, the user again places the heel 93 on the ground S. During this phase, the second support plate 735 is again in contact with the ground S, which has the effect of compressing the spring formed by the segments 731 and 733. The spring formed by the segments 731 and 733 is compressed until the weight exerted on the foot module is transferred to the ground S via the second support plate 735.

The foot module 7 allows transferring the load which is exerted on the exoskeleton to the ground S: when walking, the load is transferred to the ground successively via the second support plate 735, then via the first support plate 732 and the boot 9 of the user.

The foot module 7 allows adaptation to boots currently in use by the military, without necessitating modification of the boot. The foot module 7 can be used with a standard boot and does not require modification or adaptation of the boot.

The foot module 7 also allows the load carried by the user to be transferred to the ground, including during walking phases, and this for any type of terrain.

Back Module

FIG. 13 shows schematically, in enlarged view, the back module 2.

The back module 2 comprises a spinal column segment 21, a backrest 22 and straps 23 allowing the backrest 22 to be attached to the back of the user.

The spinal column segment 21 extends along the spinal column of the user when the back module 2 is attached to the back of the user. More precisely, the spinal column segment 21 extends between the belt 11 of the base module 1 and the backrest 22.

The backrest 22 comprises a casing 221 and a second battery 222 housed in the casing 221.

Each shoulder module 3 is capable of being connected to the back module 2.

The exoskeleton structure also comprises an attachment device 24 allowing the back module 2 to be attached to the base module 1.

The attachment device 24 comprises a third part 241 mounted fixedly on the base module 1 and a fourth part 242 mounted fixedly on the back module 2. More precisely, the third part 241 is attached to the belt 11. The fourth part 242 is attached to a lower end of the spinal column segment 21.

The fourth part 242 is capable of being attached to the third part 241, using screws for example, to attach the back module 2 to the base module 1.

In addition, the third part 241 and the fourth part 242 comprise a socket and a plug capable of being plugged into the socket to electrically connect the second battery 222 of the back module 2 to the control unit 13 of the base module 1 when the fourth part 242 is attached to the third part 241.

Spinal Column Segment

FIG. 14 illustrates more precisely the spinal column segment 21. The spinal column segment 21 comprises a plurality of vertebral elements 211 stacked on top of each other.

The number of vertebral elements 211 can be adjusted depending on the size of the user, which allows easy adaptation of the exoskeleton structure to the morphology of the user.

Alternatively or as a complement, the backrest 22 can be mounted sliding along the spinal column segment 21 so as to allow an adjustment of the back module 2.

The vertebral elements 211 can be formed from a rigid and light material, such as a composite material based on epoxy polymer filled with carbon fibers for example.

The spinal column segment 21 also comprises one or more flexible connecting element(s) 212 allowing the vertebral elements 211 to be connected to one another.

In the example illustrated in FIG. 14, each flexible connecting element 212 extends inside the stack, passing through each of the vertebral elements 211. However, as a variant, the spinal column segment 21 could comprise a flexible connecting element in the form of a flexible tubular sheath encapsulating the vertebral elements 211.

In the example illustrated in FIG. 14, each flexible connecting element 212 is an elongated element, such as a cable or an elastic cord.

Each flexible connecting element 212 has a first end connected to the casing 221 of the backrest 22 and a second end connected to the fourth attachment part 242.

Each flexible connecting element 212 is held under tension inside the vertebral elements 211 so as to exert a longitudinal compression force on the vertebral elements 211. The compression force has the effect of holding the vertebral elements 211 squeezed against one another.

In this manner, the spinal column segment 21 has a stable equilibrium position.

However, due to their elasticity, the flexible connecting elements 211 allow deformation of the spinal column segment 21 during movements of the back of the user (flexure and/or radial rotation movements and/or lateral inclination of the back), while exerting on the vertebral elements 211 a return force tending to return the spinal column segment 21 to its stable equilibrium position.

As illustrated in FIG. 15, each vertebral element 211 comprises a body 213 having an arched shape, with a concavity oriented toward the bottom of the spinal column when the spinal column segment 21 extends along the spinal column of the user and the user is standing.

Each vertebral element 211 has a recess 214 and a protrusion 215, each protrusion 215 being capable of being received in a recess 214 of another vertebral element 211 situated immediately above or below in the stack.

Each vertebral element 211 if thus connected to the following vertebral element by socketing a protrusion 215 into a recess 214. The recess 214 and the protrusion 215 have shapes such that they allow a lateral inclination movement of the vertebral element 211 with respect to the following one. Thus the recess 214 and the protrusion 215 form a connection between two vertebral elements 211 allowing a lateral inclination of the trunk of the user.

Moreover, each vertebral element 211 has channels 221 and 223 provided inside the body 213 for the passage of flexible connecting elements 212 and for the passage of electrical transmission cable(s) 224.

The back module 2 also comprises one or more electrical transmission or data transmission cable(s) 224 extending inside the spinal column segment 21 through each of the vertebral elements 211, for connecting the second battery 222 and actuators or sensors of the back module 2 to the control unit 13 of the base module 1.

It should be noted that the electrical transmission cable(s) 224 have a greater length than the length of the spinal column segment 21 so that they allow deformation of the spinal column 21 without risking damaging the cable(s).

The spinal column segment 21 allows both transmitting a vertical load exerted on the back module 2 while allowing a certain freedom of movement of the spinal column of the user.

Elbow Module

As illustrated in FIGS. 1 to 5 and 13, each elbow module 4 comprises a humeral portion 41 capable of being attached to the arm of the user, an elbow joint 42 and a radial portion 43 capable of being attached to the forearm of the user.

The humeral portion 41 comprises a humeral segment 411 capable of extending along the arm of the user, and attachment straps 412 capable of surrounding the arm of the user to attach the humeral segment 411 to the arm.

The radial portion 43 comprises a radial segment 431 capable of extending along the forearm of the user and attachment straps 432 capable of surrounding the forearm of the user to attach the radial segment 431 to the forearm.

The radial portion 43 is connected to the humeral portion 41 through the elbow joint 42. The elbow joint 42 allows rotation of the radial portion 43 with respect to the humeral portion 41 corresponding to a flexure or extension movement of the elbow of the user. The elbow joint 42 can also comprise an elbow actuator to assist the user during a flexure or extension movement of the elbow.

Shoulder Module

FIGS. 16 to 18 show schematically a shoulder module 3.

Each shoulder module 3 is capable of connecting an elbow module 4 to the back module 2.

The shoulder module 3 allows movement of the elbow module 4 with respect to the back module 2 according to three degrees of freedom, namely:

rotation of the elbow module 4 around a first axis parallel to an abduction or adduction axis of the shoulder, rotation of the elbow module around a second axis parallel to an external or internal axis of rotation of the shoulder, rotation of the elbow module around a third axis parallel to a flexure or extension axis of the shoulder.

The shoulder module 3 comprises a first pivot 31, a four-bar mechanism 32, a second pivot 33, a first connecting part 34 a third pivot 35, a second connecting part 36, a fourth pivot 37, a third connecting part 38, a fifth pivot 39, and a third connecting part 310.

The four-bar mechanism 32 comprises a first bar 321, a second bar 322, a first joint 325 connecting the second bar 322 to the first bar 321, a third bar 323, a second joint 326 connecting the third bar 323 to the second bar 322, a fourth bar 324, a third joint 327 connecting the fourth bar 324 to the third bar 323 and a fourth joint 328 connecting the fourth bar 324 to the first bar 321.

The four bars 321 to 324 are connected to one another by the four joints 325 to 328 so as to form a deformable parallelogram in a plane parallel to the coronal plane of the user. The four-bar mechanism 32 also comprises an elastic element 329, extending along a diagonal of the parallelogram and connecting the first joint 325 to the third joint 327 so as to create, on the four bars 321 to 324, a return force tending to oppose a deformation of the parallelogram due to the force of gravity exerted on the shoulder module 3. The elastic return element 329 is a tension spring of which one of the ends is connected to the first joint 325 and the other end is connected to the third joint 327.

The first bar 321 is mounted in rotation with respect to the casing 221 of the backrest 22 by means of the first pivot connection 31, around a substantially vertical axis.

Likewise, the third bar 323 is mounted in rotation with respect to the first connecting part 34 by means of the second pivot 33, around a substantially vertical axis.

The second connecting part 36 is mounted in rotation with respect to the first connecting part 34 by means of the third pivot 35. The third pivot 35 comprises an actuator.

The actuator comprises a stator and a rotor capable of being driven in rotation with respect to the stator around the first axis of rotation, the first axis of rotation being perpendicular to the axis of the second pivot 33. The actuator allows assisting the user during an abduction or adduction movement of the shoulder. To this end, the first axis of rotation $X_1$ is parallel to the axis of abduction or adduction of the shoulder.

The third connecting part 38 is connected to the second connecting part 36 by means of the fourth pivot 37. The fourth pivot 37 allows rotation of the third connecting part 38 with respect to the second connecting part 36 around a second axis of rotation $X_2$ corresponding to an external or internal rotation movement of the arm of the user.

The fourth connecting part 310 is mounted in rotation with respect to the third connecting part by means of the fifth pivot 39. The fifth pivot 39 allows rotation of the fourth connecting part 310 with respect to the third connecting part 38 around a third axis of rotation $X_3$. The fifth pivot 39 comprises an actuator.

The actuator comprises a stator and a rotor capable of being driven in rotation with respect to the stator around the third axis of rotation $X_3$, the third axis of rotation $X_3$ being perpendicular to the axis of the fourth pivot 37. The actuator allows assisting the user during a flexure or extension movement of the shoulder. To this end, the third axis of rotation $X_3$ is parallel to the axis of flexure and extension of the shoulder.

The first axis of rotation $X_1$ of the third pivot 35 intersects the second axis of rotation $X_2$ of the fourth pivot 37, perpendicular to it. Likewise, the third axis of rotation $X_3$ of the fifth pivot 39 intersects the second axis of rotation $X_2$ of the fourth pivot 37, perpendicular to it. However, the first axis of rotation $X_1$ and the third axis of rotation $X_3$ intersect the second axis of rotation $X_2$ at distinct points.

When the arm of the user is at rest (that is when the arm extends along the body of the user in the standing position), the second axis of rotation $X_2$ of the fourth pivot 37 is parallel to the axis of rotation of the second pivot 33. In addition, the third axis of rotation $X_3$ is perpendicular to the first axis of rotation $X_1$ of the third pivot 35, and to the second axis of rotation $X_2$ of the fourth pivot 37.

As illustrated in FIG. 17, the third connecting part 38 comprises two parts 381 and 382 mounted sliding with respect to one another by means of a first slideway 383. The sliding of the parts 381 and 382 with respect to one another allows shortening or lengthening of the third connecting part 38 during abduction or adduction movements of the shoulder of the user. The first slideway 383 comprises a first elastic return element 384 tending to oppose the separation of the parts 381 and 382 with respect to one another, and therefore a lengthening of the third connecting part 38. The first elastic return element 384 is therefore a tension spring.

As illustrated in FIG. 18, the fourth connecting part 310 comprises two parts 3101 and 3102 mounted sliding one with respect to the other by means of a second slideway 3103. The sliding of parts 3101 and 3102 with respect to one another allows shortening and lengthening of the fourth connecting part 310 during rotation of the forearm of the user with respect to the arm causing a flexure or an extension of the elbow. The second slideway 3103 comprises a second elastic return element 3104 tending to oppose the separation of the parts 3101 and 3102 with respect to one another, and therefore an extension of the fourth connecting part 310. The second elastic return element 3104 is a tension spring.

As the axes of rotation $X_1$, $X_2$ and $X_3$ of the shoulder module 3 do not coincide with the real axes of rotation of the joint complex of the shoulder of the user, the two slideways 383 and 3103 allow the length of the third connecting part 38 and the length of the fourth connecting part 310 to vary so as to compensate the offset of the axes of rotation.

The fourth connecting part 310 is connected to the elbow joint 42 of the elbow module by means of an attachment device 10.

Device for Attaching the Shoulder Module to the Elbow Module

The exoskeleton structure comprises two attachment devices 10, each attachment device 10 allowing attachment of a shoulder module 3 to an elbow module 4.

FIG. 19 shows schematically the attachment device 10. In the embodiment illustrated in this figure, the attachment device 10 is a so-called "bayonet type" attachment device, similar to the device 8 for attaching the hip module 5 to the base module 1 illustrated in FIGS. 9, 10A and 10B.

The attachment device 10 is capable of passing from an unlocked configuration in which the shoulder module 3 is detached from the elbow module 4, to a locked configuration in which the shoulder module 3 is attached to the elbow module 4.

The attachment device 10 comprises a first part 101 mounted fixedly on the elbow module 4 and a second part 102 mounted movable in rotation on the shoulder module 3.

More precisely, the first part 101 is attached to the stator of the actuator of the elbow joint 42. The second part 102 is mounted in rotation on the fourth connecting part 310 of the shoulder module 3 around an axis X parallel to the direction of insertion of the second part 102 into the first part 101.

The second part 102 is capable of being snapped into the first part 101, so as to allow the reversible attachment of the shoulder module 3 to the elbow module 4.

The first part 101 and the second part 102 are identical to the first part 81 and the second part 82 of the device 8 for attaching the hip module 5 to the base module 1. The attachment device 10 also comprises an elastic return element 103, in the form of a spring, capable of loading the second part 102 in a direction opposite to the direction of insertion of the first part 102 into the first part 101.

Moreover, the first part 101 and the second part 102 each comprise electrical contacts capable of electrically connecting the first battery 12 and the control unit 13 of the base module 1 to the actuator of the elbow joint 42 when the second part 102 is in the locked configuration in the first part 101.

Backpack Support Module

As illustrated in FIGS. 20 and 21, the backpack support module 14 comprises a hoop 141 and a support rod 142.

The hoop 141 is designed to be connected to the base module 1. The hoop has two opposite ends 143.

The backpack support module 14 also comprises two ball joints 145 and two attachment devices 16 allowing the hoop to be connected to the hip modules 5.

In this manner, the weight of the backpack is transferred to the lower modules, namely the hip modules 5, the knee modules 6 and the foot modules 7, which allows the user to lighten the load applied to the back.

The support rod 142 is designed to extend along the back of the user, parallel to the spinal column of the user. The rod 142 is capable of being engaged in a pouch 171 of a backpack 17 to suspend the backpack 17 from the backpack support module 14.

The rod 142 comprises a first rod element 1421, a second rod element 1422 and a damper 1423.

The first rod element 1421 is connected to the hoop 141 by a pivot 144 allowing rotation of the rod 142 with respect to the hoop 141 around an antero-posterior axis of the user. The pivot 144 allows the backpack support module to adapt to the movements of the hip of the user during walking or running.

The second rod element 1422 is capable of sliding with respect to the first rod element 1421 so as to vary a length of the rod 142.

The first rod element 1421 and the second rod element 1422 can be formed from a synthetic material (for example a composite material based on epoxy polymer) reinforced with carbon fibers. Moreover, the second rod element 1422 can comprise an end portion formed from metal.

The second rod element 1422 can be telescoping, so as to allow adjustment of the length of the rod 142.

The damper 1423 is adapted to cushion the movement of the second rod element 1422 with respect to the first rod element 1421 caused by the walking of the user.

The damper 1423 thus allows a reduction in the jolts caused by movements of the backpack 17 on the exoskeleton structure when the user walks, runs or jumps.

To this end, the damper 1423 comprises a cylinder 1424 attached to the first rod element 1421, a piston 1425 attached to the second rod element 1422 and capable of sliding inside the cylinder 1424, and an elastic element 1426 arranged between the first rod element 1421 and the second rod element 1422.

The piston 1425 delimits in the interior of the cylinder 1424 two chambers, 1427 and 1428, containing a fluid, the sliding of the piston 1425 inside the cylinder 1424 causing compression of the fluid contained in one of the chambers 1427, and transfer of the fluid to the other chamber 1428.

The elastic element 1426 preferably has a stiffness greater than or equal to 2000 Newtons per meter. Such stiffness allows the elimination of backpack oscillation amplification phenomena which could occur in the event that the mass-spring system formed by the backpack 17 and the elastic element 1426 comes into resonance during walking or running of the user.

Moreover, the damper 1423 can have an adjustable damping ratio, which allows the damping to be adapted to the mass of the backpack. In fact, the mass of the backpack can vary depending on the type of mission carried out by the user. The adjustment of the damping ratio can be obtained by modifying the total volume of chambers 1427 and 1428 (by means of a screw, for example) so as to adjust a damping ratio of the damper.

The backpack support module 14 also comprises a protective bellows seal 1429 connecting the first rod element 1421 to the second rod element 1422. The protective bellows seal 1429 allows a lengthening of the rod 142 while still preventing the penetration of liquid or debris inside the rod 142 and the damper 1423.

Moreover, the backpack support module 14 can comprises a force sensor to evaluate the mass of the bag 17 that is carried. The force sensor can be a compression strain-gage force sensor. The sensor can be disposed in the lower portion of the rod 142 above the damper 1423.

Device for Attaching the Backpack Support Module to the Hip Module

FIG. 22 shows schematically an attachment device 16 allowing one end 143 of the hoop 141 to be connected to the hip modules 5.

In the embodiment illustrated in this figure, the attachment device 16 is a so-called "bayonet type" attachment device, similar to the device 8 for attaching the hip module 5 to the base module 1, illustrated in FIGS. 9, 10A and 10B.

The attachment device 16 is capable of passing from an unlocked configuration in which the backpack module 14 is detached from the hip module 5, to a locked configuration in which the backpack module 14 is attached to the hip module 5.

The attachment device 16 comprises a first part 161 mounted fixedly on the hip module 5, and a second part 162 mounted movable in rotation and in translation on the backpack support module 14.

More precisely, the first part 161 is attached to the stator 522 of the actuator 521 of the hip joint 52. The second part 102 is mounted in rotation on the hoop 141 by means of the ball joint 145. The second part 162 is also mounted sliding with respect to the ball joint 145 along the axis X.

The second part 162 is capable of being snapped into the first part 161, so as to reversibly attach the backpack support module 14 to the hip module 5 and consequently to the base module 1.

The first part 161 and the second part 162 are identical to the first part 81 and the second part 82 of the device 8 for attaching the hip module 5 to the base module 1. The attachment device 16 also comprises an elastic return element 163, in the form of a spring, capable of loading the second part 162 in one direction, opposite to the insertion direction of the second part 162 into the first part 161.

In this manner, the hoop 141 is anchored at each of its ends 143 to the hip joints 52 of the hip modules 5. The weight of the backpack 17 is thus transferred to the ground by means of the lower modules, namely the hip modules 5, the knee modules 6 and the foot modules 7.

The invention claimed is:

1. A shoulder module for an exoskeleton structure, the shoulder module being designed to connect an elbow module attached to an arm of a user to a back module attached to a back of the user, the shoulder module comprising:
 a plurality of connecting parts, and
 a first pivot connecting two of the plurality of connecting parts while allowing rotation of one of the two connecting parts with respect to the other of the two connecting parts according to a first axis of rotation, during an abduction or adduction movement of a shoulder of the user,
 wherein the plurality of connecting parts include a first connecting part comprising two sub-parts mounted slidingly with respect to one another by a first slideway, the sliding of the two sub-parts with respect to one another by the first slideway allowing shortening of the first connecting part during rotation of the elbow module with respect to the back module caused by the abduction movement of the shoulder of the user and allowing lengthening of the first connecting part during rotation of the elbow module with respect to the back module caused by the adduction movement of the shoulder of the user, and
 wherein the first slideway comprises an elastic return element elastically opposing a separation of the two sub-parts with respect to one another leading to the lengthening of the first connecting part.

2. The module according to claim 1, further comprising:
a second pivot connecting two of the plurality of connecting parts while allowing relative rotation of the two connecting parts connected together by the second pivot with respect to one another according to a second axis of rotation, during an internal or external rotation of the shoulder of the user.

3. The module according to claim 2, wherein the first axis of rotation intersects the second axis of rotation.

4. The module according to claim 2, further comprising a third pivot connecting two connecting parts of the plurality of connecting parts while allowing relative rotation of the two connecting parts connected together by the third pivot with respect to one another according to a third axis of rotation, during a flexure or extension movement of the shoulder of the user, and wherein the third axis of rotation intersects the second axis of rotation.

5. The module according to claim 4, wherein the plurality of connecting parts include a second connecting part capable of connecting the shoulder module to an elbow joint of the elbow module, the second connecting part comprising two sub-parts mounted slidingly with respect to one another by a second slideway, the sliding of the two sub-parts with respect to one another by the second slideway allowing shortening or lengthening of the second connecting part during a flexure or extension movement of an elbow of the user.

6. The module according to claim 5, further comprising a four-bar mechanism connecting the back module to the first pivot, the four-bar mechanism comprising four bars, and four joints connecting the bars to each other while forming a deformable parallelogram.

7. The module according to claim 6, wherein the four-bar mechanism comprises an elastic member extending along a diagonal of the parallelogram and connecting two opposite joints of the four joints together.

8. The module according to claim 6, further comprising a fourth pivot connecting one of the bars of the four-bar mechanism to a part of the back module, and a fifth pivot connecting a parallel bar of the four-bar mechanism to a third connecting part of the plurality of connecting parts.

9. The module according to claim 1, further comprising a third pivot connecting two connecting parts of the plurality of connecting parts while allowing relative rotation of the two connecting parts connected together by the third pivot with respect to one another according to a third axis of rotation, during a flexure or extension movement of the shoulder of the user.

10. The module according to claim 9, wherein the plurality of connecting parts include a second connecting part capable of connecting the shoulder module to an elbow joint of the elbow module, the second connecting part comprising two sub-parts mounted slidingly with respect to one another by a second slideway, the sliding of the two sub-parts with respect to one another by the second slideway allowing shortening or lengthening of the second connecting part during a flexure or extension movement of an elbow of the user.

11. The module according to claim 10, wherein the second slideway comprises an elastic return element elastically opposing a separation of the two sub-parts with respect to one another by the second slideway leading to a lengthening of the second connecting part.

12. The module according to claim 1, further comprising a four-bar mechanism connecting the back module to the first pivot, the four-bar mechanism comprising four bars, and four joints connecting the bars to each other while forming a deformable parallelogram.

13. The module according to claim 12, wherein the four-bar mechanism comprises an elastic member extending along a diagonal of the parallelogram and connecting two opposite joints of the four joints together.

14. The module according to claim 12, further comprising a fourth pivot connecting one of the bars of the four-bar mechanism to a part of the back module and a fifth pivot connecting a parallel bar of the four-bar mechanism to a third connecting part of the plurality of connecting parts.

15. An exoskeleton structure comprising:
a back module capable of being attached to a back of a user,
an elbow module capable of being attached to an arm of the user, and
a shoulder module comprising:
a plurality of connecting parts, and first
a pivot connecting two of the plurality of connecting parts while allowing rotation of one of the two connecting parts with respect to the other of the two connecting parts according to a first axis of rotation, during an abduction or adduction movement of a shoulder of the user,
wherein the plurality of connecting parts include a first connecting part comprising two sub-parts mounted slidingly with respect to one another by a first slideway, the sliding of the two sub-parts with respect to one another by the first slideway allowing shortening of the first connecting part during rotation of the elbow module with respect to the back module caused by the abduction movement of the shoulder of the user and allowing lengthening of the first connecting part during rotation of the elbow module with respect to the back module caused by the adduction movement of the shoulder of the user, and
wherein the first slideway comprises an elastic return element elastically opposing a separation of the two sub-parts with respect to one another leading to the lengthening of the first connecting part.

* * * * *